United States Patent
Mori

(10) Patent No.: US 7,995,446 B2
(45) Date of Patent: Aug. 9, 2011

(54) OPTICAL ELEMENT AND OPTICAL PICKUP APPARATUS

(75) Inventor: Nobuyoshi Mori, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 617 days.

(21) Appl. No.: 12/028,982

(22) Filed: Feb. 11, 2008

(65) Prior Publication Data

US 2008/0192613 A1  Aug. 14, 2008

(30) Foreign Application Priority Data

Feb. 14, 2007 (JP) ................. 2007-033608

(51) Int. Cl.
    *G11B 7/00* (2006.01)
(52) U.S. Cl. .................. 369/112.07; 369/112.12
(58) Field of Classification Search ............ 369/112.03, 369/112.05, 112.06, 112.07, 112.08
    See application file for complete search history.

(56) References Cited

U.S. PATENT DOCUMENTS

| | | | |
|---|---|---|---|
| 5,663,794 A * | 9/1997 | Ishizuka ............... | 356/499 |
| 2002/0085210 A1 * | 7/2002 | Takayama et al. ....... | 356/499 |
| 2004/0240370 A1 * | 12/2004 | Kobayashi et al. ...... | 369/112.05 |
| 2004/0263814 A1 * | 12/2004 | Unno ................... | 355/67 |
| 2005/0018584 A1 * | 1/2005 | Yoo et al. ............. | 369/112.08 |
| 2005/0226122 A1 * | 10/2005 | Ooi et al. ............. | 369/112.05 |

FOREIGN PATENT DOCUMENTS

| | | |
|---|---|---|
| JP | 11-054411 | 2/1999 |
| JP | 2001-195769 | 7/2001 |
| JP | 2005-216430 | 8/2005 |

OTHER PUBLICATIONS

M. Born et al., Principles of Optics: Electromagnetic Theory of Propagation, Interference and Diffraction of Light, 7th edition, Cambridge University Press, Cambridge, United Kingdom, pp. 837-840 (1999).
Notice of Reasons for Refusal dated Mar. 9, 2011 from Japanese Patent Office in corresponding Japanese Patent Application No. 2007-033608.

* cited by examiner

*Primary Examiner* — Adam R Giesy
(74) *Attorney, Agent, or Firm* — Finnegan, Henderson, Farabow, Garrett & Dunner, L.L.P.

(57) ABSTRACT

The present invention relates to an optical element for use in an optical pickup apparatus and an optical pickup apparatus. An optical element is provided for use in an optical pickup apparatus which records or reproduces information by converging a light flux from a light source onto an information recording surface of an optical disc and by receiving a light flux reflected by the information recording surface by a photodetector. The optical element includes: a first area including an optical axis of the optical element; and a second area surrounding the first area and including a diffractive structure in a radial shape. The first area transmits a light flux from the light source, and the second area diffracts a light flux with the predetermined wavelength from the light source.

16 Claims, 19 Drawing Sheets

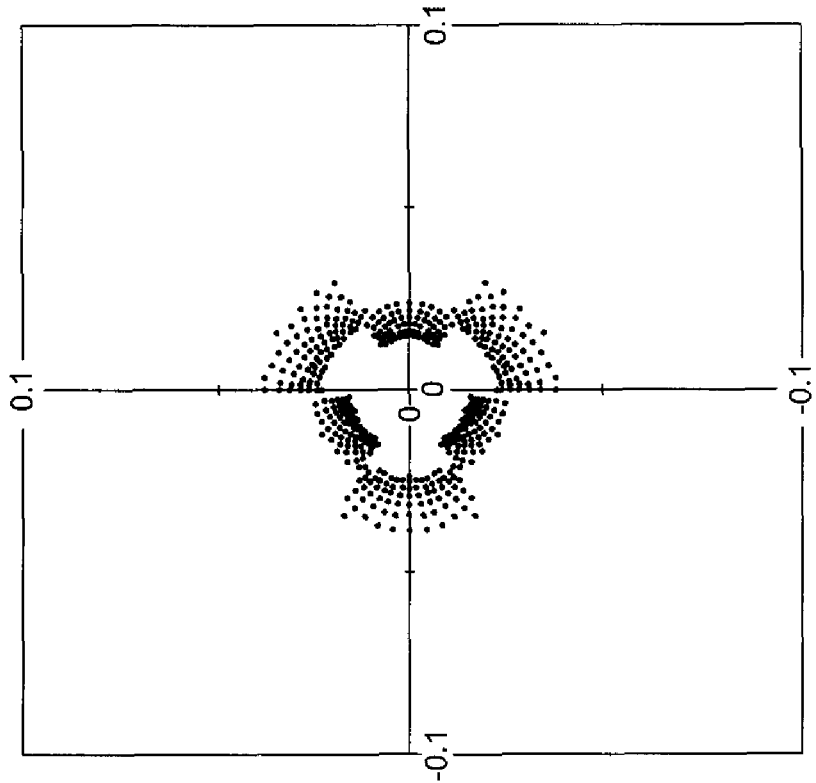
FIG. 14(a) (INFORMATION RECORDING SURFACE +1st order)
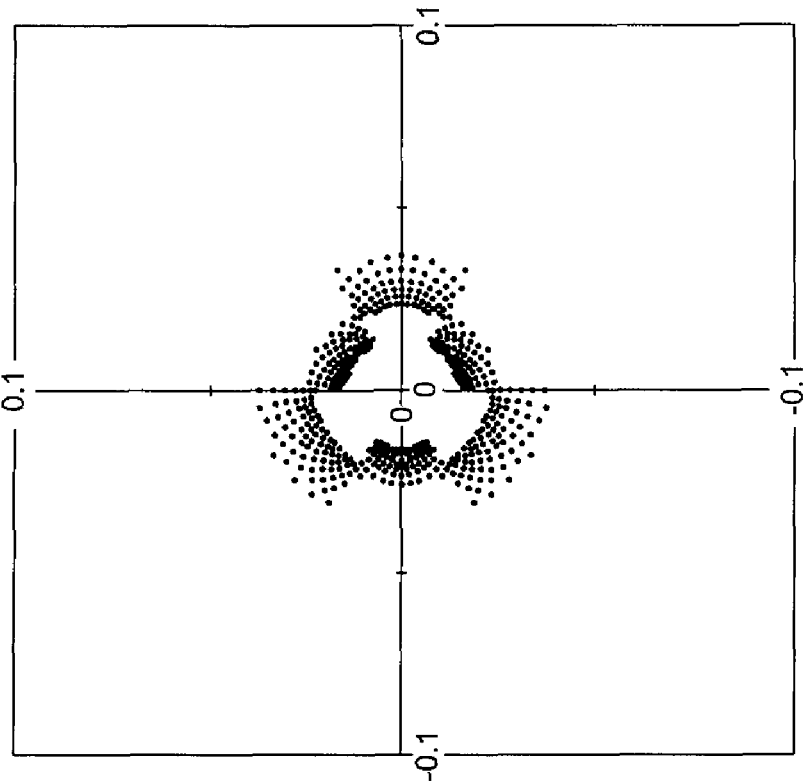
FIG. 14(b) (INFORMATION RECORDING SURFACE -1st order)

(INFORMATION RECORDING SURFACE)

(SENSOR SURFACE)

(SENSOR SURFACE)

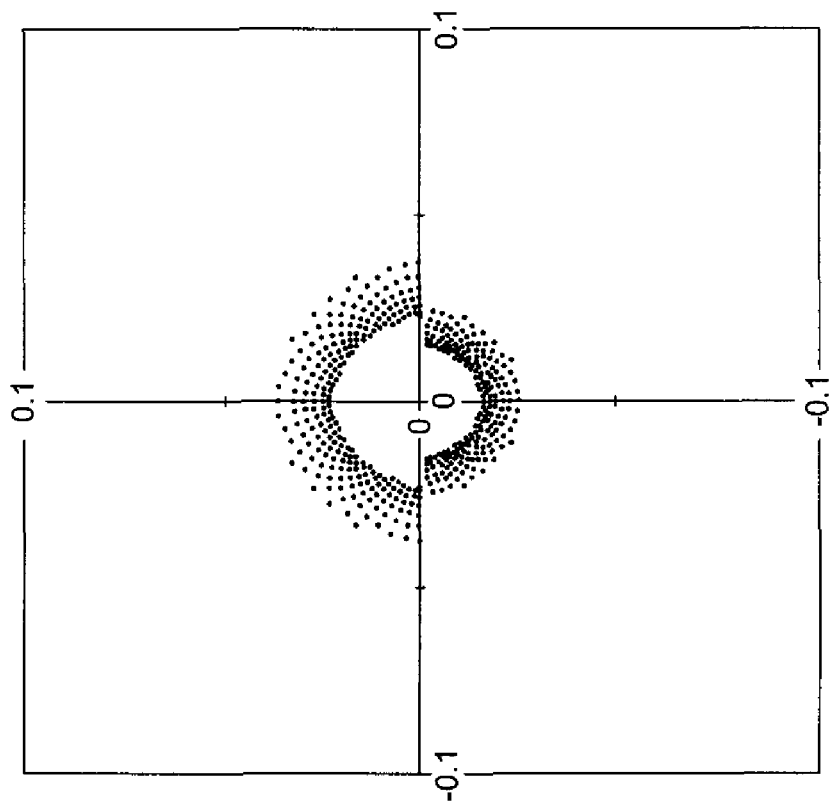
FIG. 19(a) (INFORMATION RECORDING SURFACE +1st ORDER)
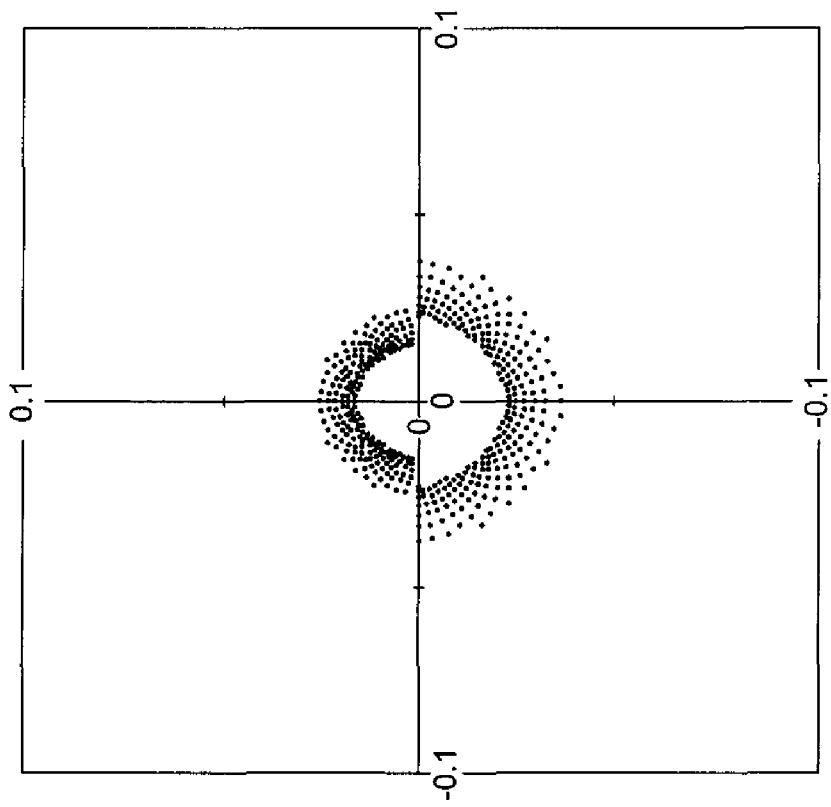
FIG. 19(b) (INFORMATION RECORDING SURFACE -1st ORDER)

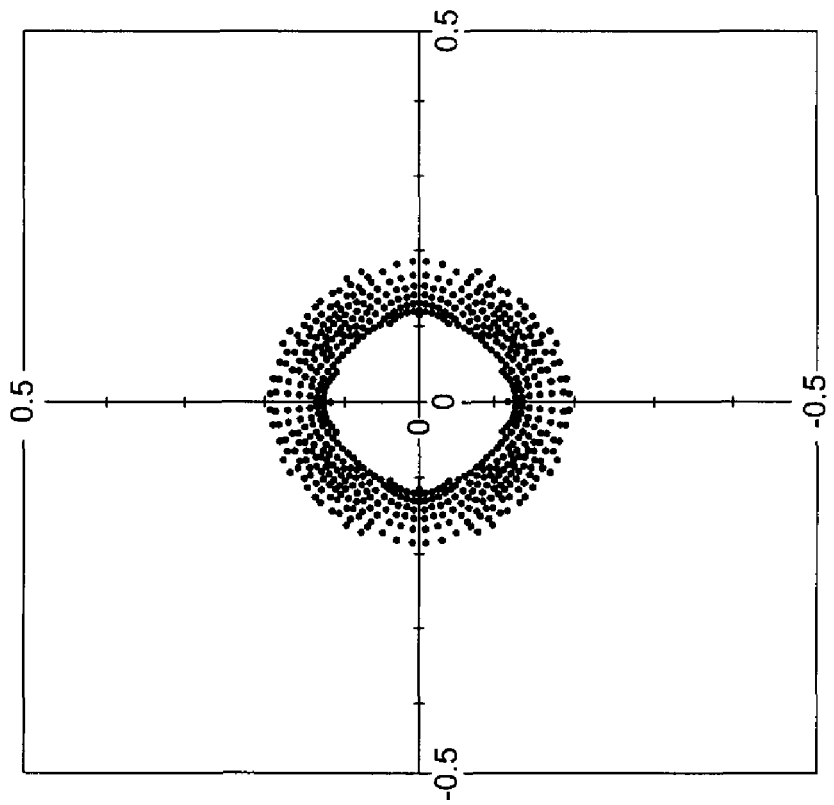
FIG. 20(b) (SENSOR SURFACE)
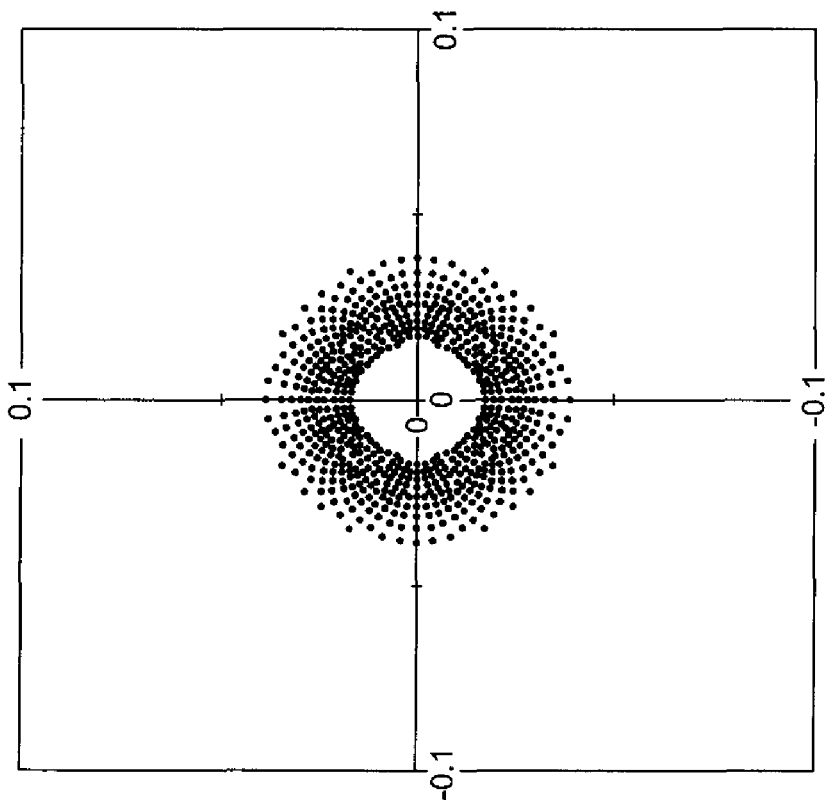
FIG. 20(a) (INFORMATION RECORDING SURFACE)

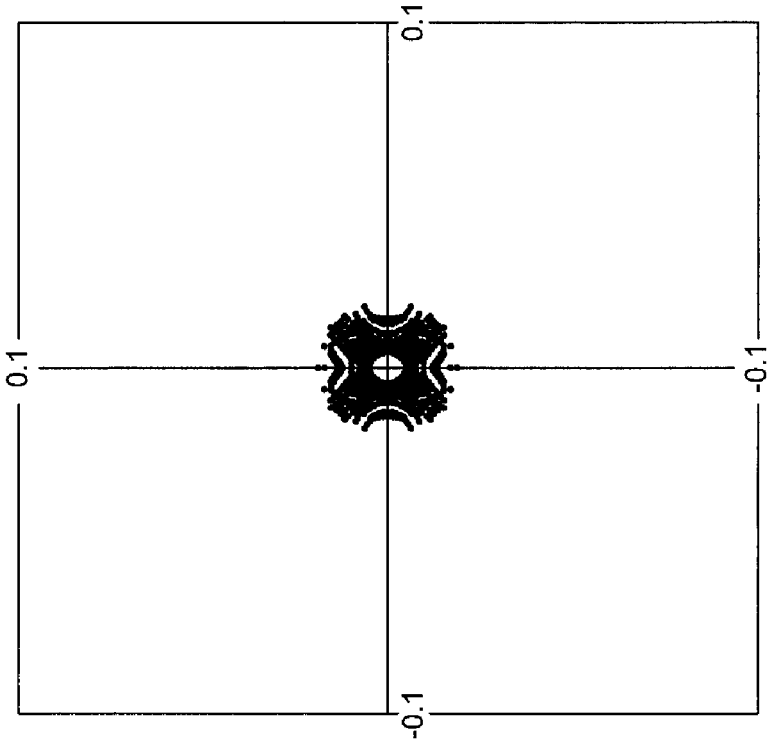
FIG. 24(a) RELATED ART (INFORMATION RECORDING SURFACE)
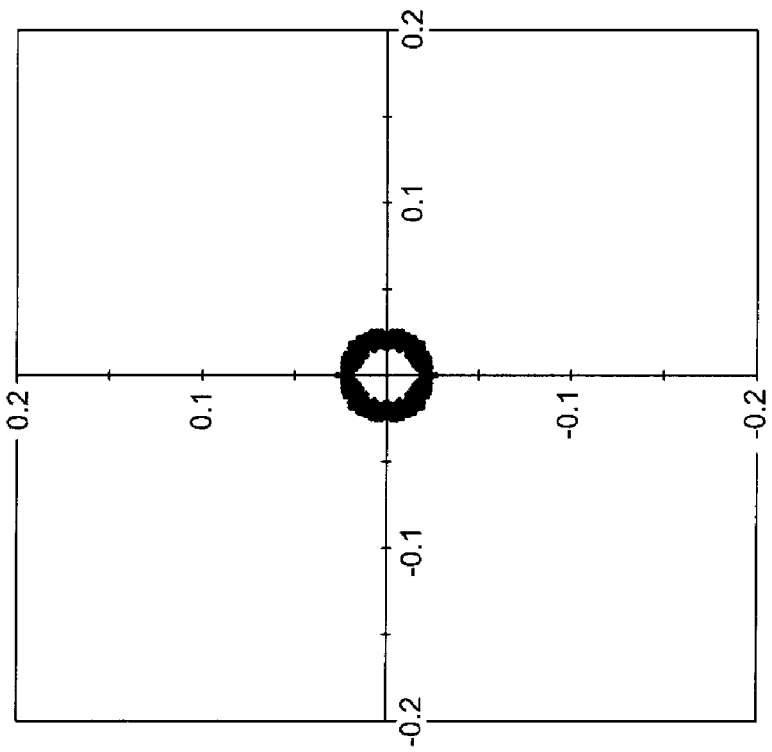
FIG. 24(b) RELATED ART (SENSOR SURFACE)

OPTICAL ELEMENT AND OPTICAL PICKUP APPARATUS

This application is based on Japanese Patent Application No. 2007-033608 filed on Feb. 14, 2007, in Japanese Patent Office, the entire content of which is hereby incorporated by reference.

TECHNICAL FIELD

The present invention relates to an optical element for an optical pickup apparatus that can records and/or reproduces information on optical information recording media of different types (which are called also optical discs), and to an optical pickup apparatus employing the optical element.

BACKGROUND

In recent years, there has been a rapid advancement of research and development of a high density disc system capable of recording and/or reproducing (hereinafter, "recording and/or reproducing" will be described as "recording/reproducing") information by using a violet semiconductor laser with a wavelength of about 400 nm. Comparing with DVD which is an optical disc having a diameter of 12 cm with specifications of NA 0.6, light source wavelength of 650 nm and memory capacity of 4.7 GB, one example of the high density disc system records/reproduces information with specifications of NA 0.85 and light source wavelength of 405 nm for an optical disc, so-called Blu-ray Disc (hereinafter referred to as BD). In the optical system, information of 23-27 GB per one layer can be recorded for the optical disc having a diameter of 12 cm identical in terms of size to DVD. Further, another example of the high density disc system records/reproduces information with specifications of NA 0.65 and light source wavelength of 405 nm to an optical disc, so-called HD DVD (hereinafter referred to as HD). In the optical system, information of 15-20 GB per one layer can be recorded for the optical disc having a diameter of 12 cm. Incidentally, an amount of coma caused by an inclination (skew) of the optical disc increases in BD. Therefore a protective layer of BD is designed to be thinner than that in DVD (where the thickness is 0.1 mm in BD, as against 0.6 mm in DVD) to reduce an amount of coma caused by skew. In the present specification, these optical discs of this kind are called "high density disc". On the other hand, as for HD, a thickness of a protective layer is made to be 0.6 mm in the same way as in DVD.

When considering the present situation where DVD and CD (compact disc) on which various information are recorded are on the market, it is desired that a single player can record/reproduce information properly for optical discs in as many types as possible.

When compatibly recording/reproducing information by using a single optical pickup apparatus for plural types of optical discs, there is a problem caused by NA of an objective lens that is different for each optical disc. For example, when recording/reproducing information for an optical disc having a specification of large NA, all light fluxes within an effective diameter corresponding to the NA (which is named as NA1) need to be converged on an information recording surface of an optical disc. On the other hand, when recording/reproducing information for an optical disc having specification of NA that is smaller than the aforesaid NA, which is named as NA2, it is necessary to make a photodetector to detect nothing by controlling a light flux passing through the portion outside an effective diameter which corresponds to NA2. To Control the light passing through the portion outside an effective diameter is called aperture controlling.

As a method of realizing this aperture controlling, it is considered that a diffractive optical element forms a light flux that passes through an outer portion of the effective diameter corresponding to NA2 into a flare light on the information recording surface of an optical disc, as disclosed in Japanese Patent Publication Open to Public Inspection (JP-A) No. 2001-195769.

However, when a saw-toothed diffractive structure in a form of concentric circles described in JP-A No. 2001-195769 is used to generate flare light, the structure for that turns out to be complicated. It needs highly-qualified technology for forming a microscopic structure on a molding transfer surface of a die, to cope with that complicated structure. Further, even when such die can be formed, it still needs technology at a high level for forming a highly accurate diffractive structure on an optical element, thus, synergism of the foregoing caused notable cost increase, which has been a problem.

SUMMARY

The present invention has been achieved in view of the above problems, and provides an optical element for an optical pickup apparatus capable of conducting aperture controlling properly despite of its low price, and an optical pickup apparatus employing the optical element.

An optical element relating to the present invention is provided for use in an optical pickup apparatus which records or reproduces information by converging a light flux from a light source onto an information recording surface of an optical disc and by receiving a light flux reflected by the information recording surface by a photodetector. The optical element comprises a first area including an optical axis of the optical element; and a second area surrounding the first area and comprising a diffractive structure in a radial shape. In the optical element, the first area transmits a light flux from the light source, and the second area diffracts a predetermined light flux the light source.

Another optical element relating to the present invention is an optical element comprising: a first area including an optical axis of the optical element; and a second area surrounding the first area and comprising a plurality of steps. In the optical element, the first area transmits a light flux from the light source, and the second area changes a traveling direction of a light flux with the wavelength λ2 from the light source. The second area is in a ring shape, and is divided into 2·n portions along a circumference of the ring shape, where n is an odd number. Opposing portions across the optical axis among the 2·n portions are different in at least one of size and shape of the steps from each other.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which:

FIGS. 14(a) and 14(b) are diagrams showing spots of the +first order diffracted light and spots of the −first order diffracted light, both on the information recording surface of the optical disc;

FIG. 17(a) is a front view wherein optical element OE1 is viewed in the optical axis direction, and FIG. 17(b) is a sectional view wherein optical element OE shown in FIG. 17(a) is cut on line A-A and is viewed in the direction of the arrow;

FIGS. 19(a) and 19(b) are diagrams showing respectively spots of the +first order diffracted light and spots of the −first order diffracted light, both on the information recording surface of the optical disc;

FIGS. 20(a) and 20(b) are diagrams showing respectively compounded spots on the information recording surface of the optical disc and spots on the light-receiving surface of the sensor;

FIG. 24(a) is a diagram showing an example of spots on an information recording surface of an optical disc in an aperture controlling element based on diffraction in a form of ring-shaped zones wherein a pitch gradually grows smaller as a position of the pitch departs away from the vicinity of an optical axis in the second area toward a peripheral portion, and FIG. 24(b) is a diagram showing an example of spots on a light-receiving surface of the sensor;

Each of FIGS. 27(a) and 27(b) is a schematic diagram showing a design example of a diffractive structure compatibly used for BD and DVD.

DESCRIPTION OF THE PREFERRED EMBODIMENT

Preferred embodiments of the present invention will be described below.

A first embodiment is an optical element provided for use in an optical pickup apparatus which records or reproduces information by converging at least a light flux with a wavelength $\lambda 2$ from a light source onto an information recording surface of an optical disc and by receiving a light flux reflected by the information recording surface by a photodetector. The optical element comprises: a first area including an optical axis of the optical element; and a second area surrounding the first area and comprising a diffractive structure in a radial shape. In the optical element, the first area transmits a light flux from the light source, and the second area diffracts a light flux with the wavelength $\lambda 2$ from the light source.

Figure 1:
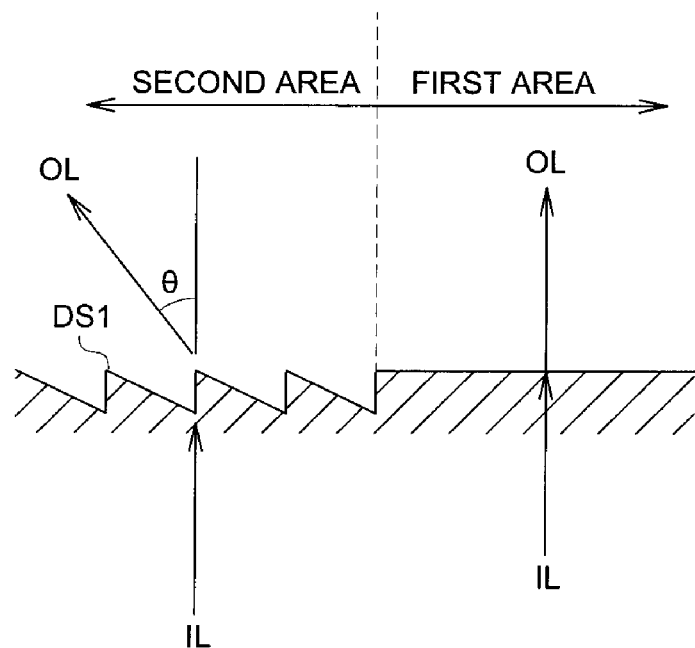
FIG. 1 is a sectional view in the direction perpendicular to an optical axis for an optical element, which is assumed to be provided as a parallel flat plate, in the conventional example.

The principle of the invention will be explained as follows, referring to the drawings. FIG. 1 is a sectional view in the direction perpendicular to an optical axis of an optical element, which is provided as a parallel flat plate, in the conventional example. In FIG. 1, the first area is a flat surface, diffractive structure DS1 of a ring-shaped zone type is formed on the second area, and an optical axis is positioned at the right side of the figure. In this case, when incident light flux IL having a prescribed wavelength enters the first area to be in parallel with the optical axis, outgoing light flux OL that is in parallel with the optical axis is emitted. On the other hand, when incident light flux IL having a prescribed wavelength enters the second area to be in parallel with the optical axis, outgoing light flux OL is emitted with tilted by angle θ in the direction to depart from the optical axis, due to an effect of diffraction of the diffractive structure DS1. By utilizing this, it is possible to make the outgoing light flux OL coming from the second area into flare light on the information recording surface of the optical disc through an objective lens.

Figure 2:
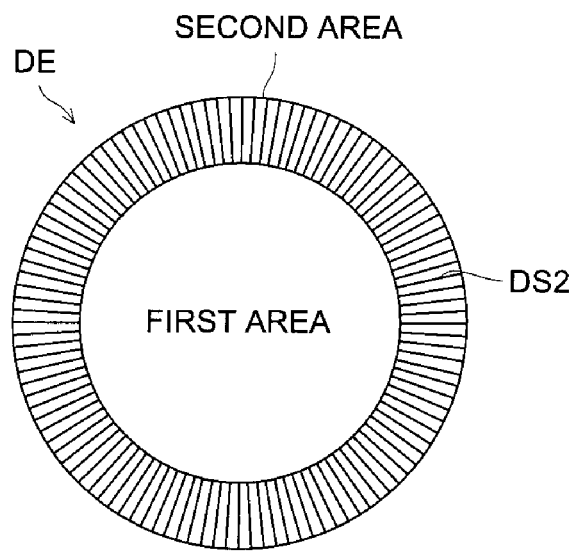
FIG. 2 is a diagram wherein optical element OE is viewed in the optical axis direction.
Figure 3:
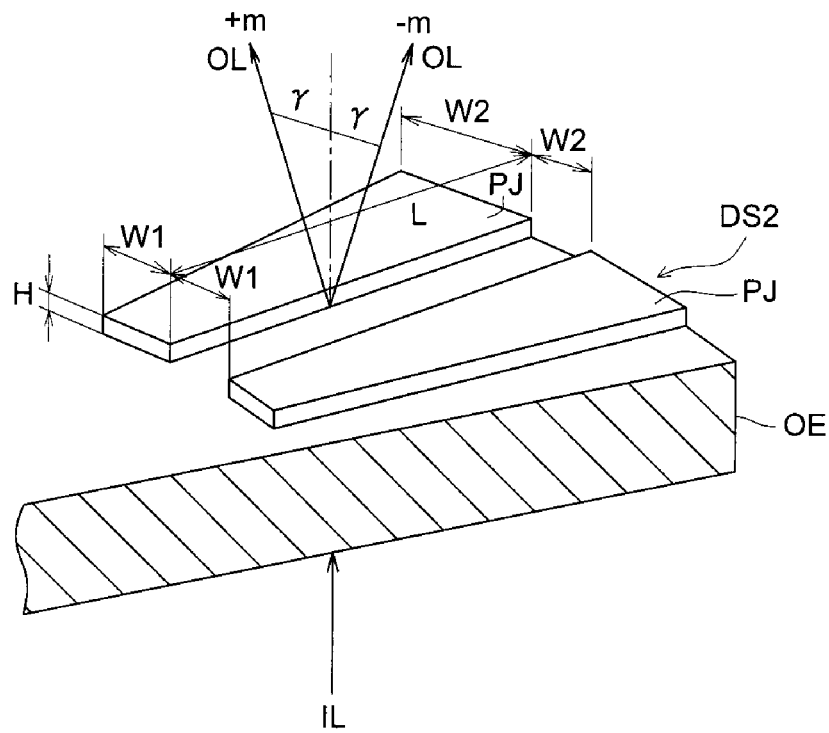
FIG. 3 is a perspective view in section showing enlarged diffractive structure DS2 in radial shape.

FIG. 2 is a diagram wherein optical element OE representing an example of the invention is viewed in the optical axis direction, and FIG. 3 is a perspective view in section showing enlarged radial diffractive structure DS2 that is formed on optical element OE. As shown in FIG. 2, diffractive structure DS2 in a radial shape is formed only on the second area in a ring shape on optical element OE which is provided as a parallel flat plate in this example. The diffractive structure DS2 in a radial shape is composed of microscopic protrusions PJ (which is called also steps) which extend in the direction perpendicular to the optical axis and are separated in a direction of a circumference of the ring shape as shown in FIG. 3. In this example, an extended line of each protrusion PJ intersects with others on the optical axis of optical element OE. Incidentally, when an optical element is in a form of a flat plate, it is preferable that a top surface of the protrusion is in parallel with a substrate of the optical element as shown in FIG. 3.

When incident light flux IL having a predetermined wavelength enters into the first area to be in parallel with an optical axis, outgoing light flux OL that is in parallel with an optical axis is emitted, which is the same as conventional example in FIG. 1. However, when incident light flux IL having a predetermined wavelength enters the second area to be in parallel with an optical axis, an outgoing light flux OL is emitted with being tilted by angle γ within a plane that includes a center of incident light flux IL and is in parallel with an optical axis, namely, within a direction of the circumference, due to a function of diffraction of the diffractive structure DS2.

Figure 4:
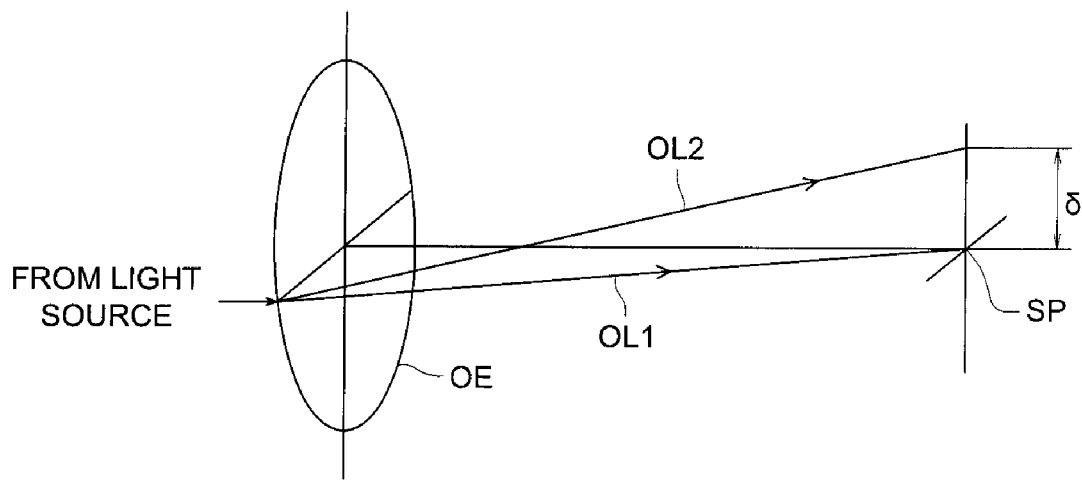
FIG. 4 is a schematic diagram showing relationship between optical element OE and spot light on an information recording surface of an optical disc.

FIG. 4 is a schematic diagram showing relationship between optical element OE and spot light on an information recording surface of an optical disc, in which, however, an objective lens is omitted. In FIG. 4, light flux OL1 that has passed through the outermost portion of the first area arrives at an edge of spot SP converged on an information recording surface through an unillustrated objective lens. On the other hand, light flux OL2 that has passed through the innermost portion of the second area arrives at a position that is away from the center of spot SP by distance δ to become flare light, when converged on an information recording surface through an unillustrated objective lens, because the light flux OL2 is tilted by angle γ in the direction of the circumference from light flux OL1. Light that has arrived at the position that is away from the center of spot SP by distance δ does not affect writing or reading of recording mark such as pits at all, and light forming spot SP is limited within the first area. Therefore, generation of coma in the case of a tilt of the optical disc is reduced. By providing a diffractive structure in a radial shape as in the foregoing, an aperture controlling function can be exhibited, in the same way as in the case of providing a diffractive structure of a ring-shaped zone type. However, the radial diffractive structure has a merit that a molded product is not caught easily by a die even when the molded product shrinks, and an optical element can be formed easily through transfer, when compared with ring-shaped zone diffractive structure, because steps are arranged in radial shape.

Figure 5:
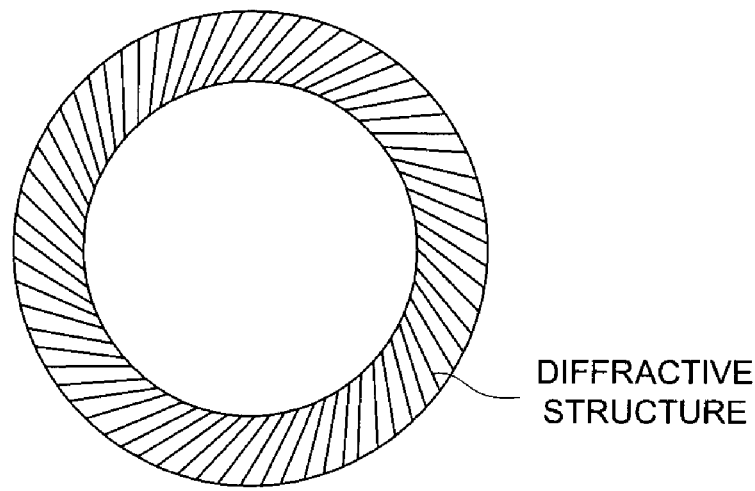
FIG. 5 is a diagram wherein an example of an optical element relating to the present invention is viewed in the optical axis direction.
Figure 6:
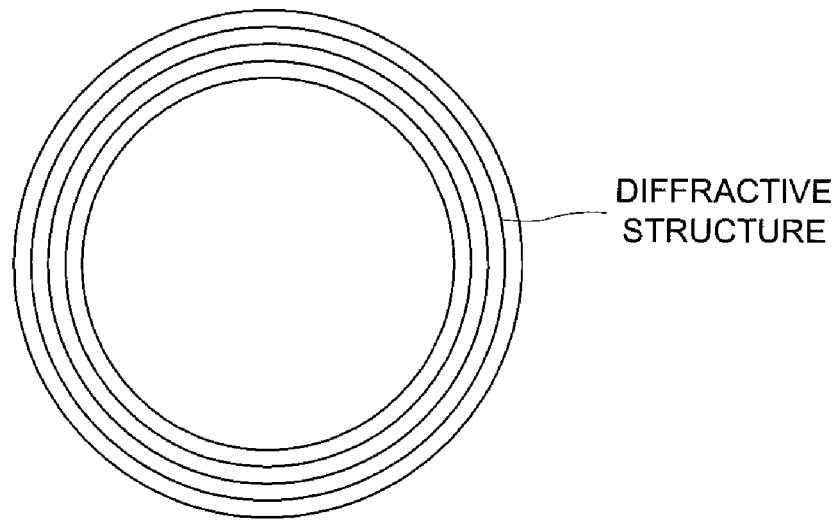
FIG. 6 is a diagram wherein an example of an optical element that is not included in the present invention is viewed in the optical axis direction.
Figure 7:
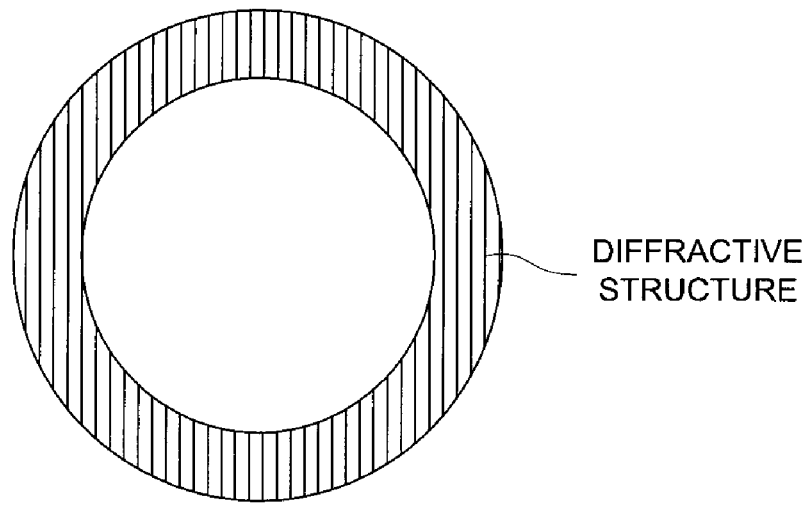
FIG. 7 is a diagram wherein an example of an optical element that is not included in the present invention is viewed in the optical axis direction.

In this case, the optical element may either be a parallel flat plate, a lens, or a reflecting mirror. Further, if the optical element is made of resin, it is preferable because mass production at low cost is possible. However, the optical element may also be made of glass. "A diffractive structure in radial shape" is a structure having plural microscopic protrusions (which are also called steps) which extend in the direction perpendicular to an optical axis and are separated in the direction of the circumference. Namely, it includes structures in which each protrusion extends in the direction from an arbitral position in the first area to the outside of the second area and each protrusion is arranged in the aforesaid direction linearly or in a curved shape. For example, it includes the following structures: a structure in which steps of the diffractive structure are arranged in radial shape around the center that positionally agrees with an optical axis in the first area as shown in FIG. 2; and a structure in which each step of the diffractive structure extends in the direction from an arbitral position in the first area to the outside of the second area and all of the steps are inclined in the same direction on a plane perpendicular to the optical axis, while the steps does not extend from one position of the optical axis, as shown FIG. 5. However, the diffractive structure in a shape of concentric circles as shown in FIG. 6 and the diffractive structure in which steps are in parallel each other as shown in FIG. 7 are not included in the diffractive structure in radial shape relating to the present invention. Further, the present invention can also provide a doughnut-shaped optical element including the first area being empty. It is preferable that an optical element includes the first area representing a flat plate and the second area having the diffractive structure which are made of the same material.

In the optical pickup apparatus employing an optical element relating to the invention, all light fluxes which have passed through the first area are converged onto an information recording surface, then are reflected and are received by a photodetector. On the other hand, a prescribed light flux which has passed through the second area is not converged on the information recording surface. When the photodetector has a sub-sensor and a main sensor, it is preferable that a prescribed light flux which has passed through the second area is not received by the main sensor after being reflected on the information recording surface.

As for the first embodiment, the optical pickup apparatus preferably records or reproduces information by converging a first light flux with a first wavelength λ1 emitted from a first light source onto an information recording surface of a first optical disc including a protective substrate with a thickness t1, and by converging a second light flux with a second wavelength λ2 (λ2>λ1) emitted from a second light source onto an information recording surface of a first optical disc including a protective substrate with a thickness t2 (t1≦t2). The optical pickup apparatus also preferably records or reproduces information, by receiving a light flux reflected by the information recording surface of each of the first and second optical discs by a photodetector. Further, it is preferable that the first area transmits the first light flux and the second light flux, and the second area transmits the first light flux and diffracts the second light flux.

The embodiment enables to conduct appropriate aperture control by using a diffractive structure in a radial shape formed on the second area of the aforesaid optical element, even when a specification of NA differs between when the aforesaid first optical disc is used and when the aforesaid second optical disc is used.

The objective lens converges the first light flux after passing through the first area and the first light flux after passing through the second area onto an information recording surface of the first optical disc. A photodetector receives a light flux reflected on the information recording surface of the first optical disc. The objective lens converges the second light flux after passing through the first area onto the information recording surface of the second optical disc. The second light flux which has entered the second area is diffracted and passes through the objective lens, but the objective lens does not converge the light flux on the information recording surface of the second optical disc. It is preferable that a light flux reflected on the information recording surface of the second optical disc is not received by a main sensor, when the photodetector has a sub-sensor and a main sensor.

In the above embodiment, it is preferable that the first light flux after passing through the second area and the second light flux after passing through the second area travel in different directions from each other.

In the above embodiment, it is preferable that the second light flux after passing through the second area becomes a flare light on the information recording surface of the second optical disc.

In the first embodiment, it is preferable that the diffractive structure is a binary-type diffractive structure.

In the first embodiment, it is also preferable that the diffractive structure is a stair-type diffractive structure.

Incidentally, defining that a diffractive structure generate X % of +first order diffracted light and Y % of −first order diffracted light when a light flux enters into the diffractive structure, it is preferable that X and Y satisfy the following conditional expression. In particular, when an optical pickup apparatus has a single light source or plural light sources capable of emitting light fluxes each having a different wavelength, it is preferable that the following conditional expression is satisfied in the case of a light flux having a longer wavelength.

$$0.8X \leq Y \leq 1.2X$$

In the first embodiment, it is preferable that the second area is in a ring shape, and is divided into 2·n portions along a circumference of the ring shape, where n is an odd number. Further, it is preferable that opposing portions across the optical axis among the 2·n portions comprise different diffractive structures from each other. Incidentally, for securing symmetry of optical property of optical elements, it is preferable that n is not less than 3.

In this embodiment, when conducting aperture control by using the diffractive structure of a wavelength-selective type which diffracts a light flux having a specific wavelength and transmits a light flux having another wavelength depending on a difference in a wavelength of a light flux, it is considered, for example, a binary-type structure or a stair-type structure as the diffractive structure of this kind.

Figure 8:
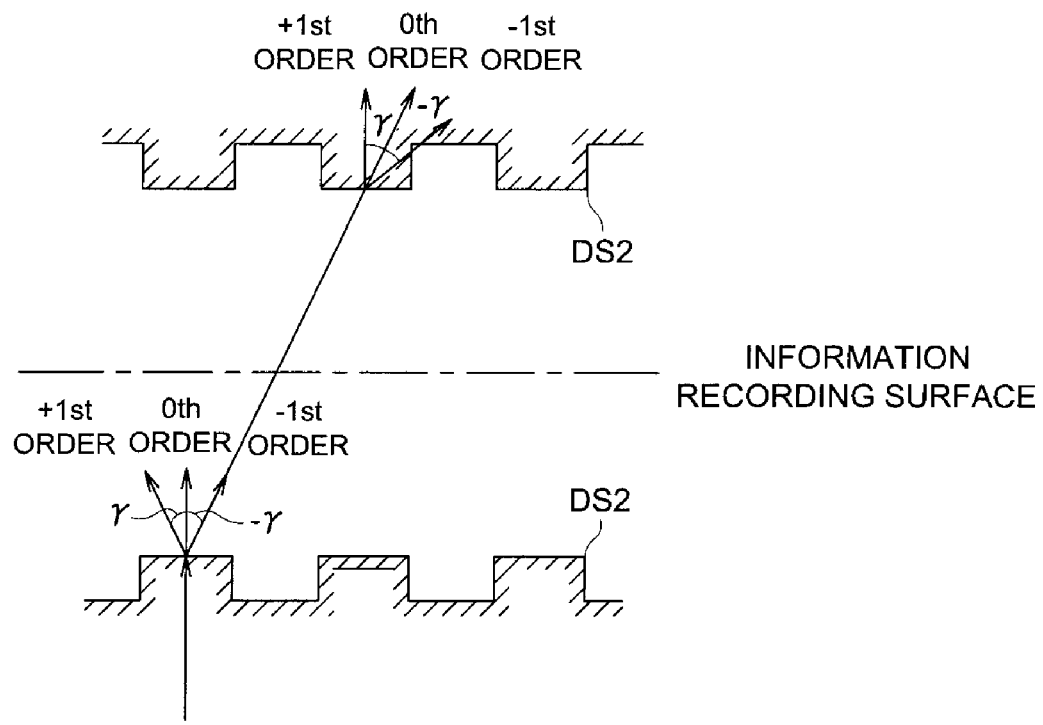
FIG. 8 is a schematic diagram showing an enlarged section of a diffractive structure of a binary structure.

FIG. 8 is a schematic diagram showing an enlarged section of a diffractive structure of a binary structure, in which a light flux reflected on an information recording surface is shown in a developed form for easy understanding. In FIG. 8, a light flux after passing through diffractive structure DS2 in a radial shape of the optical element is reflected on an information recording surface of the optical disc, and enters the same diffractive structure DS2 in a radial shape. If the light flux enters the structure in parallel with an optical axis of the optical element in this case, diffractive structure DS2 exhibits an effect of diffraction, and generates +first order diffracted light and −first order diffracted light to be substantially the same in terms of quantity as shown in FIG. 8. When considering the −first order diffracted light, the diffracted light sometimes enters into the same diffractive structure DS2 again after being reflected on the information recording surface of the optical disc. Even in that case, +first order diffracted light and −first order diffracted light are generated to be the same in terms of quantity. At this situation, −first order diffracted light is not detected by the photodetector of the optical pickup apparatus because it is tilted by angle 2·γ from an optical axis, resulting in no problem. However, +first order diffracted light results in a light flux that is in parallel with an optical axis. In the same way, considering a light flux emitted from diffractive structure DS2 as +first order diffracted light and traveling toward a optical disc, it results in a parallel light flux undesirably when the light flux after reflected on the optical disc passes through the diffractive structure DS2 again and the diffractive structure DS2 generates −first order diffracted light. Therefore, even a light that is flare light on the information recording surface of the optical disc can undesirably overlap to spot reflected light on the light-receiving surface of the sensor, because the flare light becomes a substantially parallel light identical to light that forms a spot on the information recording surface of the optical disc after it is reflected on the information recording surface and passes through the optical element relating to the invention. As a result, flare light can also enter into the light-receiving surface of the sensor, resulting in adverse influences on reading of signals, track control and focus control. This phenomenon similarly causes in the aperture control by conventional ring-shaped zone diffractive structure.

Figure 25:
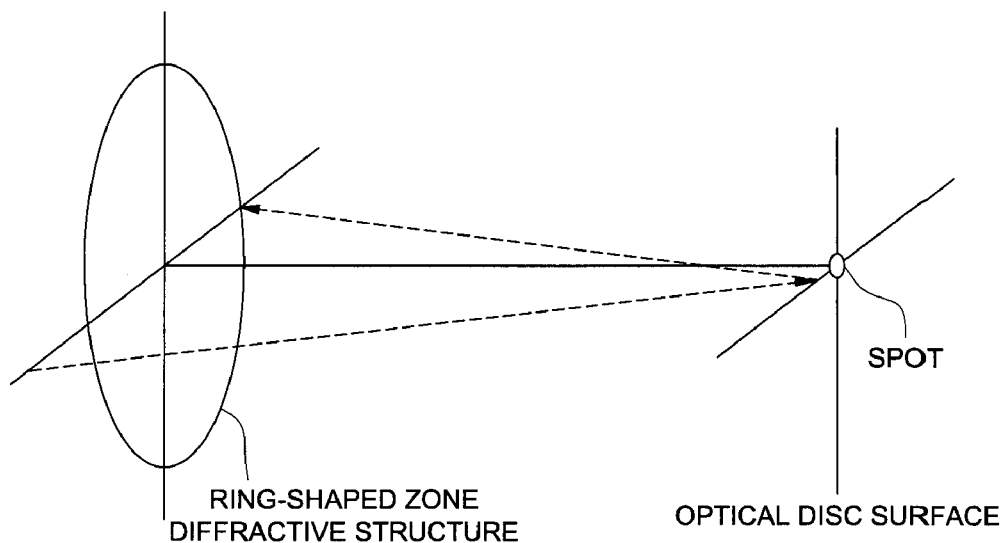
FIG. 25 is a schematic diagram showing a behavior of a light that the light diffracted by a ring-shaped-zone diffractive structure enters to a position being displaced from the spot position on an information recording surface of an optical disc, then is reflected there and enters again the ring-shaped-zone diffracting portion.

FIGS. 24(a) and 24(b) show a comparative example of utilizing an aperture controlling element based on diffraction in a form of ring-shaped zones. FIG. 24(a) shows an example of spots on an information recording surface of an optical disc when utilizing an aperture controlling element based on diffraction in a form of ring-shaped zones whose pitch gradually grows smaller as a position of the pitch departs away from the vicinity of an optical axis in the second area toward a peripheral portion. FIG. 24(b) shows an example of spots on the sensor when utilizing the aperture controlling element. As shown in FIG. 25, light diffracted by a ring-shaped zone diffractive structure as a comparative example enters the position that is away from a spot position on the information recording surface of an optical disc where it is reflected, and enters the ring-shaped zone diffraction again. However, since the entering position is slightly different, a pitch at the entering position is different and a diffraction angle is also different. Therefore, the light becomes flare light that has spread on the light-receiving surface of the sensor, without becoming a perfect parallel light. However, it still enters the sensor element because it does not spread sufficiently. For causing it to spread sufficiently on the light-receiving surface of the sensor, it is necessary to make a difference of pitch on the diffractive structure to be large. Namely, a pitch on the peripheral portion is made to be extremely small. In each of examples shown in FIG. 24(a) and FIG. 24(b), an incident light with wavelength of 785 nm is make to be flare light by an optical system including an objective lens with a focal length of 2.3 mm, the second area extends in a range through which light fluxes corresponding to NA 0.5 through NA 0.85 pass, and a ring-shaped zone diffractive structure with pitch at the inner portion of 120 μm and with pitch at an outermost peripheral portion of 70 μm. This flare light on the information recording surface of an optical disc is spread to be 20 μm in terms of a radius which is sufficient when a size of a recording mark of CD is considered. However, when this reflected light is converged on a light-receiving surface of the sensor at ×15 magnification of an optical system including an objective lens, a collimator and a sensor lens, the diffraction effects are cancelled when light travels to the information recording surface and returns from the information recording surface as described above, and the flare light is insufficiently spread because of a small difference of a pitch. Further, reflected light of a spot and reflected light of the flare light interfere each other because they are converged to slight different positions from each other on the light-receiving surface of the sensor. It forms an interference pattern such as Newton ring. Therefore, when detecting focus and tracking by using an astigmatism method or a three-beam method, bright and dark portions of interference fringes affect intensity difference detected by respective elements divided and arranged on the light-receiving surface of the sensor, resulting in a detecting error. This problem can be solved by utilizing a structure described in the above embodiment in which the second area is in a ring shape, and the second area is divided into a plurality of equal small areas in quantity of 2·n (where n is an odd number) in the direction of circumference of the ring, and opposing small areas across the optical axis have different diffractive structures from each other.

Figure 9:
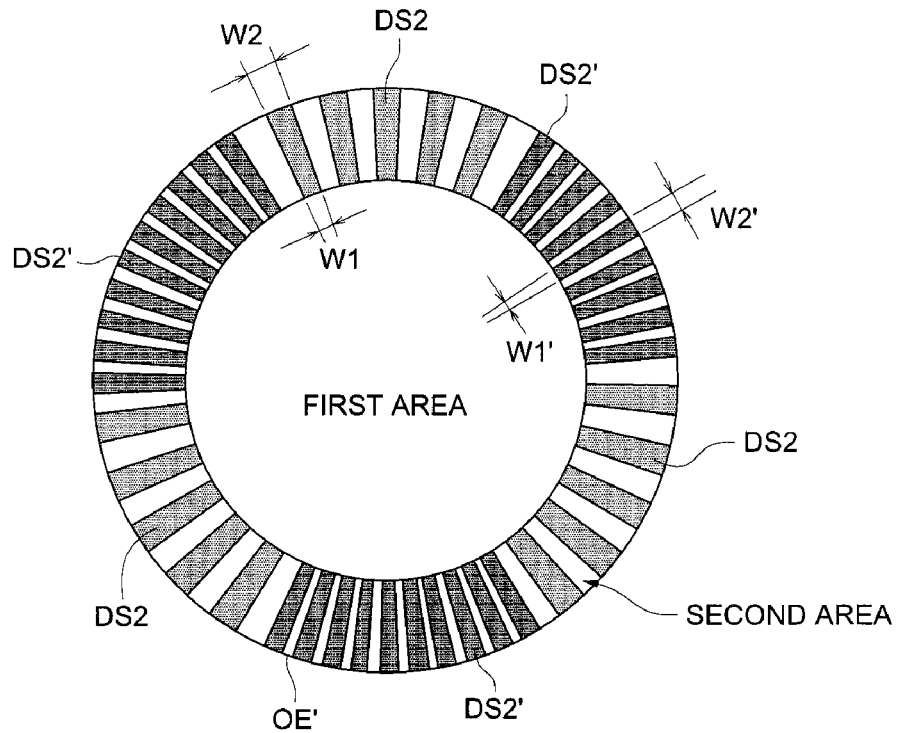
FIG. 9 is a diagram wherein another example of an optical element relating to the invention is viewed in the optical axis direction.
Figure 10:
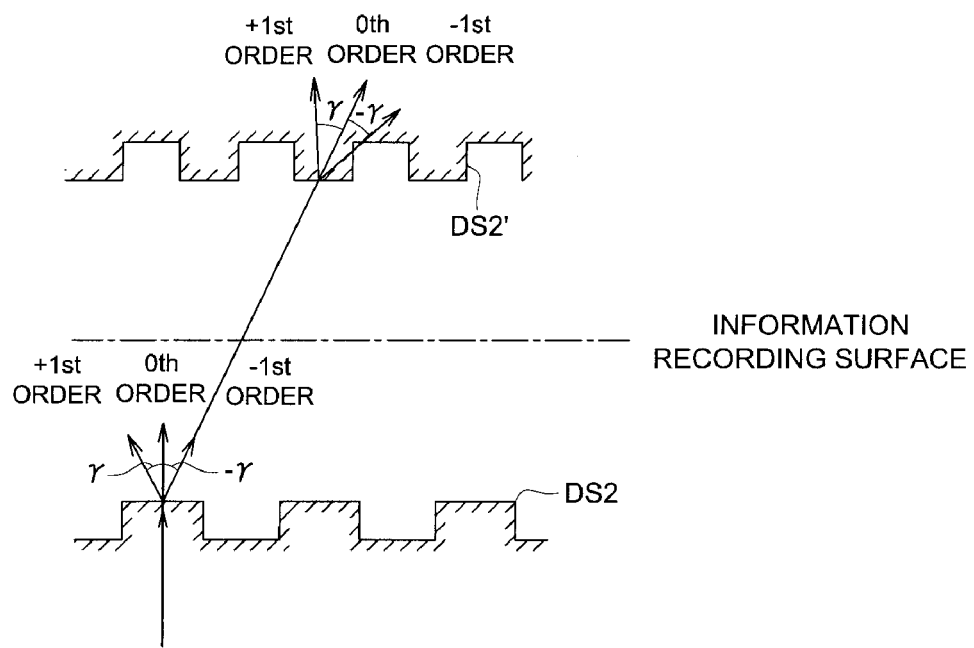
FIG. 10 is a schematic diagram showing an enlarged section of a diffractive structure of a binary structure corresponding to an example shown in FIG. 9.

FIG. 9 is a diagram wherein optical element OE' representing an example of the invention is viewed in the optical axis direction. FIG. 9 is a schematic diagram identical to FIG. 8 including optical element OE'. In FIG. 9, the second area in a ring shape is separated into small areas by being divided equally into six portions (n=3) in the direction of the circumference. Diffractive structure DS2 and diffractive structure DS2' which are different in terms of a pitch of the steps are arranged in the small areas alternately. If a light flux enters to the optical element to be in parallel with an optical axis of the optical element as shown in FIG. 10, the diffractive structure DS2 exhibits diffraction effects and generates +first order diffracted light and −first order diffracted light having respectively diffraction angles of ±γ to be substantially the same in terms of quantity. While, the diffractive structure DS2' generates +first order diffracted light and −first order diffracted light having respectively diffraction angles of ±γ' (γ≠γ') to be substantially the same in terms of quantity.

The diffractive structure DS2 and the diffractive structure DS2' are arranged with opposing each other across the optical axis, which is apparent from FIG. 9. Therefore, a light flux emitted from any one of the diffractive structure DS2 and the diffractive structure DS2' enters a diffractive structure that is opposite to the diffractive structure from which the light flux was emitted. In this structure, even when the +first order diffracted light (or −first order diffracted light) emitted from the diffractive structure DS2 is reflected on an information recording surface of the optical disc, and enters the diffractive structure DS2' again, and the +first order diffracted light and the −first order diffracted light are generated, none of them is made to be in parallel with an optical axis because of γ≠γ'. Therefore, it controls that the diffracted light is detected by a photodetector as a ghost.

In the above embodiment, it is preferable that the opposing portions across the optical axis comprise diffractive structures which are different in pitch from each other. Owing to this, even when the light fluxes having the same wavelength enters into the optical element, they are different in terms of the order of the diffracted light, and an effect shown in FIG. 10 can be obtained.

Figure 22:
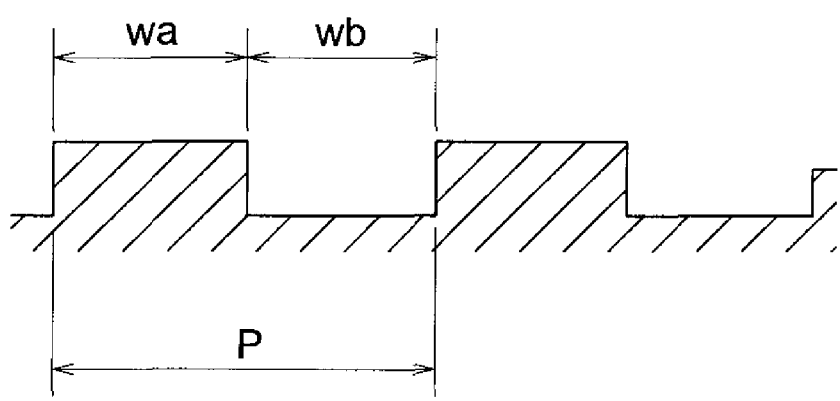
FIG. 22 is a diagram wherein an example of a diffractive structure representing a binary structure is viewed in the direction perpendicular to the optical axis of the optical element.
Figure 23:
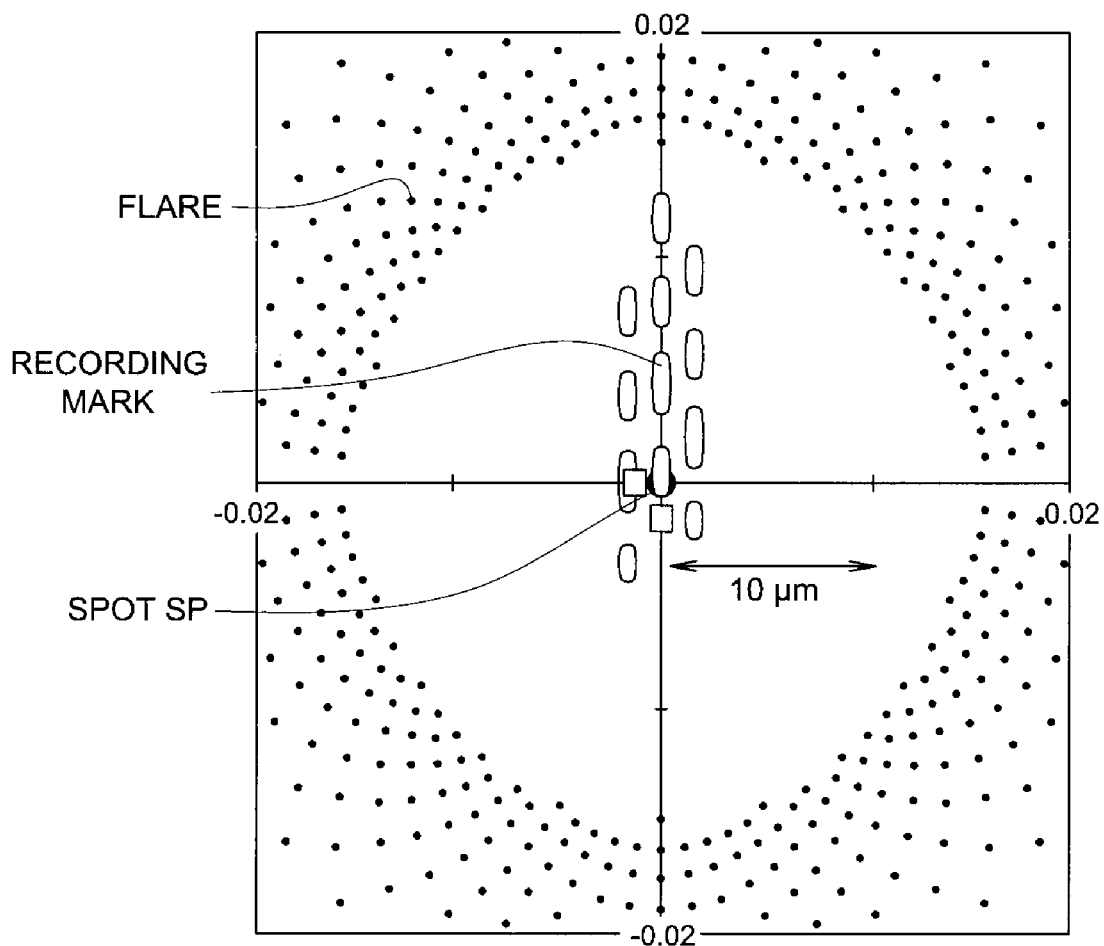
FIG. 23 is a diagram showing positional relationship between a recording mark and a spot on the information recording surface of the optical disc.

FIG. 22 is a diagram wherein an example of a diffractive structure representing a binary structure is viewed in the direction perpendicular to the optical axis of the optical element. In FIG. 22, pitch P means a length obtained by adding a width Wa of a protrusion of the diffractive structure and a width Wb of a recessed portion of the diffractive structure. It is preferable that the width Wa is the same as the width Wb (Wa=Wb).

In the above embodiment, it is preferable that the diffractive structure is a stair-type diffractive structure, and the opposing portions across the optical axis comprise stairs which rise in different directions from each other around the optical axis.

Figure 11:
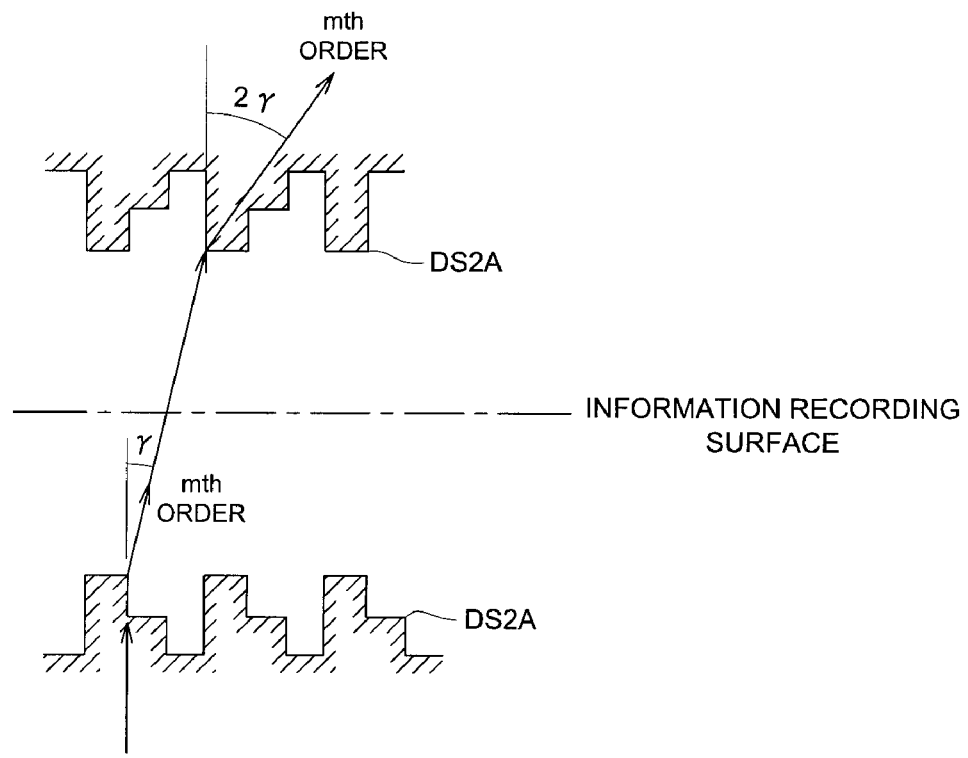
FIG. 11 is a schematic diagram identical to that in FIG. 8 that shows an optical element having a diffractive structure of a one-side stair type.

FIG. 11 is a schematic diagram identical to that in FIG. 8 that shows an optical element having a diffractive structure of a non-axial-symmetric stair type. Diffractive structure of a non-axial-symmetric stair type DS2A has characteristics that opposing areas emit diffracted light fluxes in the opposite direction. Therefore, when $m^{th}$ order diffracted light emitted from diffractive structure DS2A in the direction tilted from an optical axis by angle γ is reflected on the information recording surface of the optical disc and enters diffractive structure DS2A' again, as shown in FIG. 11, the $m^{th}$ order diffracted light emitted therefrom is emitted in the direction tilted from an optical axis by angle 2·γ, which controls that the diffracted light is detected by a photodetector as a ghost.

Further, in the above embodiment, the optical element may further comprise a quarter-wavelength-plate member.

By the optical element having a quarter-wavelength-plate member providing a functions of quarter wavelength plate, it enable to provide an optical path difference (phase difference) of quarter wavelength between, for example, two linearly polarized light fluxes oscillating in the directions perpendicular to each other passing through the plate. For example, it is possible to convert a light of linear polarization that has entered a quarter wavelength plate into a light of circular polarization.

Figure 12:
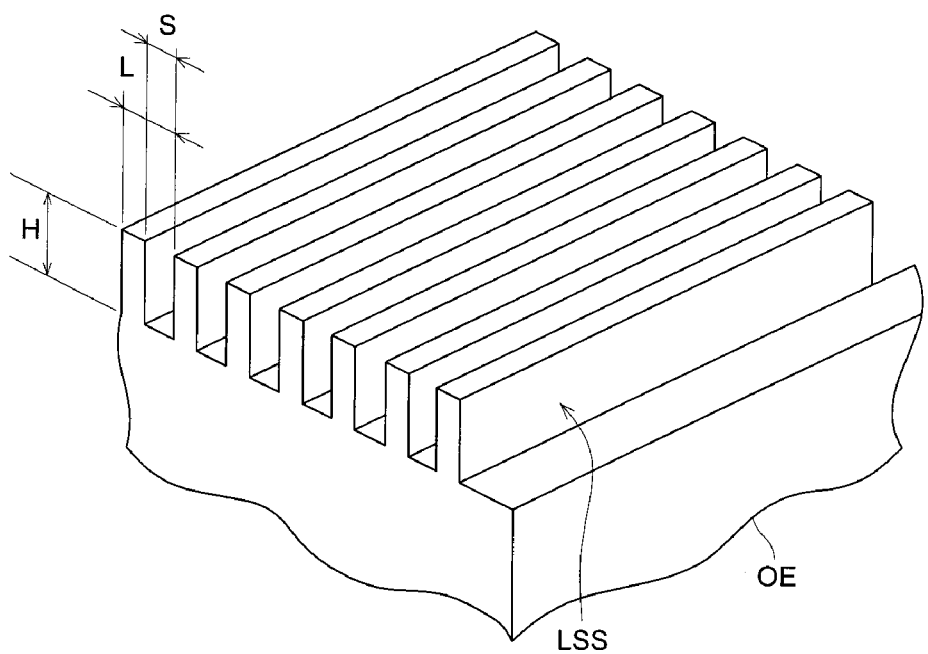
FIG. 12 is a perspective view showing an example of line-and-space structure LSS.

As a member to provide a function of a quarter wavelength plate, there is considered a form birefringence structure, for example. Now, "form birefringence" will be explained. The form birefringence is double refraction generated by directional properties of microscopic structures. It is known that a microscopic periodic structure (so-called line-and-space structure LSS: see FIG. 12) wherein flat plates each having no double refraction property and having a different refractive index, for example, are arranged to be in parallel at a cycle much smaller than a wavelength of light (<λ/2) generates double refraction property (see Principle of Optics, Max Born and Emil Wolf, PERGAMON PRESS LTD.). Refractive index $n_p$ of light whose polarization direction is in parallel with a groove and refractive index $n_v$ of light whose polarization direction is perpendicular to a groove are provided as follows.

$$n_p=(tn_1^2+(1-t)n_2^2)^{1/2} \quad (1)$$

$$n_v=1/(t/n_1^2+(1-t)/n_2^2)^{1/2} \quad (2)$$

Where, $n_1$ represents a refractive index of material (line) where the microscopic periodic structure is formed, $n_2$ represents a refractive index of material (space) to be filled in a groove, and t represents a duty ratio of the microscopic periodic structure represented by the following expression.

$$t=w_1/(w_1+w_2) \quad (3)$$

While double refraction property of crystal and calcite are peculiar to their materials and they can hardly be changed, the double refraction property of the microscopic periodic structure can be easily controlled by changing its materials and shapes. Further, phase difference (delay amount) Re between light whose polarization direction is in parallel with a groove and light whose polarization direction is perpendicular to a groove is shown by the following expression. Where, d represents a height (depth of the groove) of double refraction structure in the microscopic periodic structure.

$$Re=(n_p-n_v)d \quad (4)$$

The expressions mentioned above indicate that the phase difference (delay amount) Re can be changed if duty ratio t of double refraction of the microscopic periodic structure and height (depth of a groove) d of double refraction structure of the microscopic periodic structure are variable.

However, for providing a quarter-wavelength-plate member working for a laser beam having a wavelength of 400 nm to optical element OE, for example, it is necessary to form line-and-space structure LSS with microscopic structure with height H=1200 nm on an optical surface (see FIG. 12), under the condition that resin material whose refractive index at normal temperature is about 1.5 is used, and width L of line and width S of space are made respectively to be 100 nm and 90 nm. The form birefringence structure of this kind may be provided on a reverse side (the surface on which no diffractive structure is provided) of optical element OE. In this embodiment, a member provided as a quarter wavelength plate are not limited to the form birefringence structure. Though a form birefringence member and an optical element relating to the invention may be glued together after being manufactured separately, it is preferable to mold integrally plastic optical element OE wherein form birefringence structure SD is formed on one side, and diffractive structure DS in a radial shape relating to the invention is formed on the other side.

An second embodiment of the present invention is an optical pickup apparatus comprising: a first light source for emitting a first light flux with a first wavelength $\lambda 1$; a second light source for emitting a second light flux with the second wavelength $\lambda 2$ ($\lambda 2 > \lambda 1$); the optical element of any one of the above embodiments; and an objective lens; and a photodetector. The objective lens is provided for conversing the first light flux onto an information recording surface of a first optical disc including a protective substrate with a thickness t1, and conversing the second light flux onto an information recording surface of a second optical disc including a protective substrate with a thickness t2 ($t1 \leq t2$). In the embodiment, the optical pickup apparatus records or represents information by which the objective lens converses the first light flux after passing through the first area and the first light flux after passing through the second area onto the information recording surface of the first optical disc, and by which the objective lens converses the second light flux after passing through the first area onto the information recording surface of the second optical disc and does not converge the second light flux diffracted by the second area onto the information recording surface of the second optical disc.

A third embodiment of the present invention is an optical pickup apparatus comprising: a first light source for emitting a first light flux with a first wavelength $\lambda 1$; a second light source for emitting a second light flux with the second wavelength $\lambda 2$ ($\lambda 2 > \lambda 1$); a third light source for emitting a third light flux with a third wavelength $\lambda 3$ ($\lambda 1 < \lambda 3 < \lambda 2$); the optical element of any one of the above embodiment; an objective lens; and a photodetector. The objective lens is provided for conversing the first light flux onto an information recording surface of a first optical disc including a protective substrate with a thickness t1, conversing the second light flux onto an information recording surface of a second optical disc including a protective substrate with a thickness t2 ($t1 \leq t2$), and conversing the third light flux onto an information recording surface of a third optical disc including a protective substrate with a thickness t3 ($t1 \leq t3 < t2$). The optical pickup apparatus records or represents information by which the first area and the second area transmit the third light flux, by which the objective lens converges the first light flux after passing through the first area and the first light flux after passing through the second area onto the information recording surface of the first optical disc, by which the objective lens converges the second light flux after passing through the first area onto the information recording surface of the second optical disc and does not converges the second light flux diffracted by the second area onto the information recording surface of the second optical disc, and by which the objective lens converges the third light flux after passing through the first area onto the information recording surface of the third optical disc, and transmits the third light flux after passing through the second area to converge a part of the third light flux after passing through the second area onto the information recording surface of the third optical disc and not to converge a rest part of the third light flux after passing through the second area onto the information recording surface of the third optical disc.

A fourth embodiment of the invention is an optical element for use in an optical pickup apparatus which records or reproduces information by converging at least a light flux with a wavelength $\lambda 2$ from a light source onto an information recording surface of an optical disc and by receiving a light flux reflected by the information recording surface by a photodetector. The optical element comprises a first area including an optical axis of the optical element; and a second area surrounding the first area and comprising a plurality of steps. In the optical element, the first area transmits a light flux from the light source, and the second area changes a traveling direction of a light flux with the wavelength $\lambda 2$ from the light source. The second area is in a ring shape, and is divided into $2 \cdot n$ portions along a circumference of the ring shape, where n is an odd number. Opposing portions across the optical axis among the $2 \cdot n$ portions are different in at least one of size and shape of the steps from each other.

Figure 28:
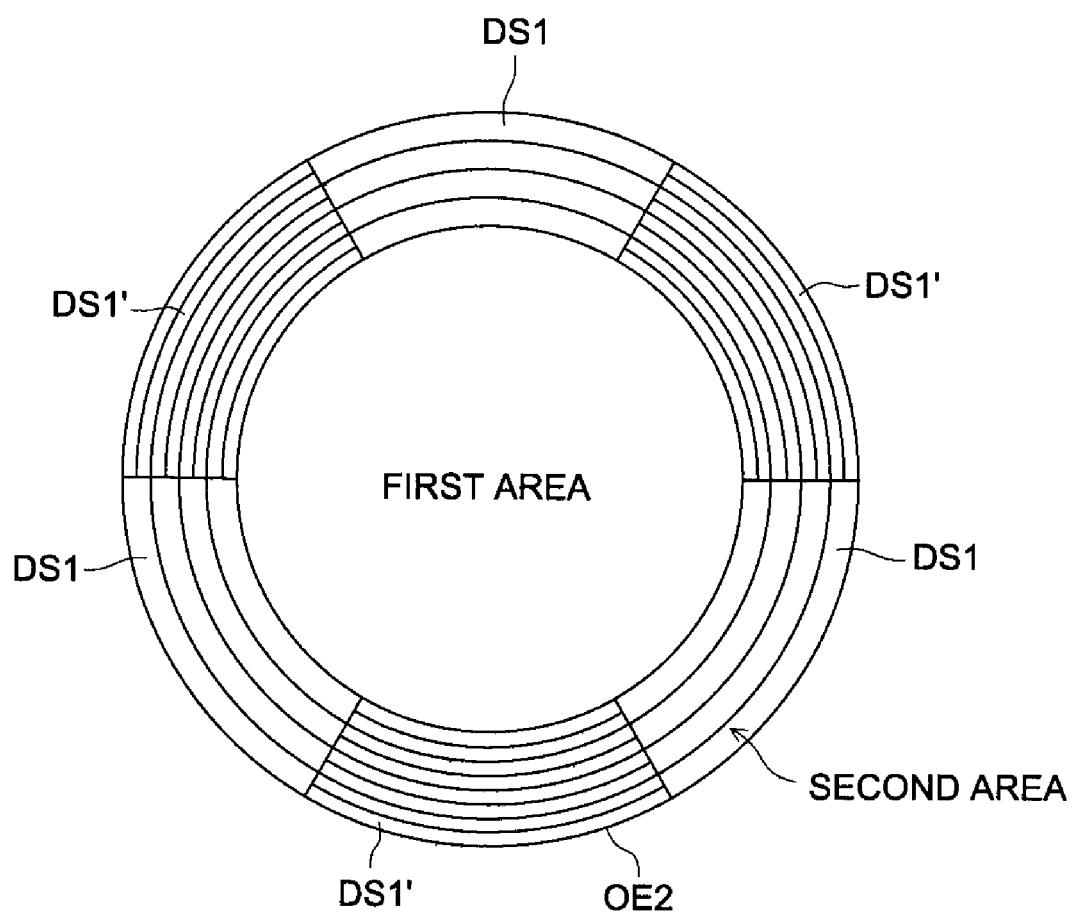
FIG. 28 is a diagram wherein another example of an optical element relating to the invention is viewed in the optical axis direction.

In the aforesaid embodiment, the light flux whose traveling direction has been changed by the steps of one small area in the second area is reflected on an information recording surface of an optical disc and enters another small area having a structure which is different from the above small in the second area. In such structure, light passes through the steps with different size and shape between when light traveling toward the information recording surface passes through the steps and when light returning from the information recording surface passes through the steps. Therefore, the structure does not generate a light flux such that its direction is changed when the light travels toward the information recording surface but the light is further changed to be parallel light when the light returns from the information recording surface (for example, see FIG. 10). Incidentally, the present embodiment can be applied not only to a diffractive structure in a radial shape but also to a ring-shaped zone diffractive structure. In other words, in this embodiment, steps of each small area can extend on the second area in both of a radial direction as a radial shape as shown in FIG. 2 and FIG. 5 and a circumferential direction of the second area as shown in FIG. 28. FIG. 28 is a diagram in which optical element OE2 representing an example of the invention is viewed in the optical axis direction. In FIG. 28, the second area in a ring shape is separated into small areas by being divided equally into six portions (n=3) in the direction of the circumference. Diffractive structure DS1 and diffractive structure DS1' in a ring-shaped zone including different steps in its pitch, are arranged in the small areas alternately. As is apparent from FIG. 28, the diffractive structure DS1 and the diffractive structure DS1' are arranged with opposing to each other across the optical axis. In the structure with a ring-shaped zone form, the small areas opposing with each other across the optical axis may have steps different in either their pitch or shape. Also in the structure with a ring-shaped zone form, an effect of the invention is especially conspicuous by utilizing a structure of a binary type.

The invention makes it possible to provide an optical element for an optical pickup apparatus capable of conducting appropriated aperture control in spite of its moderate price, and to provide an optical pickup apparatus employing the optical element.

Figure 13:
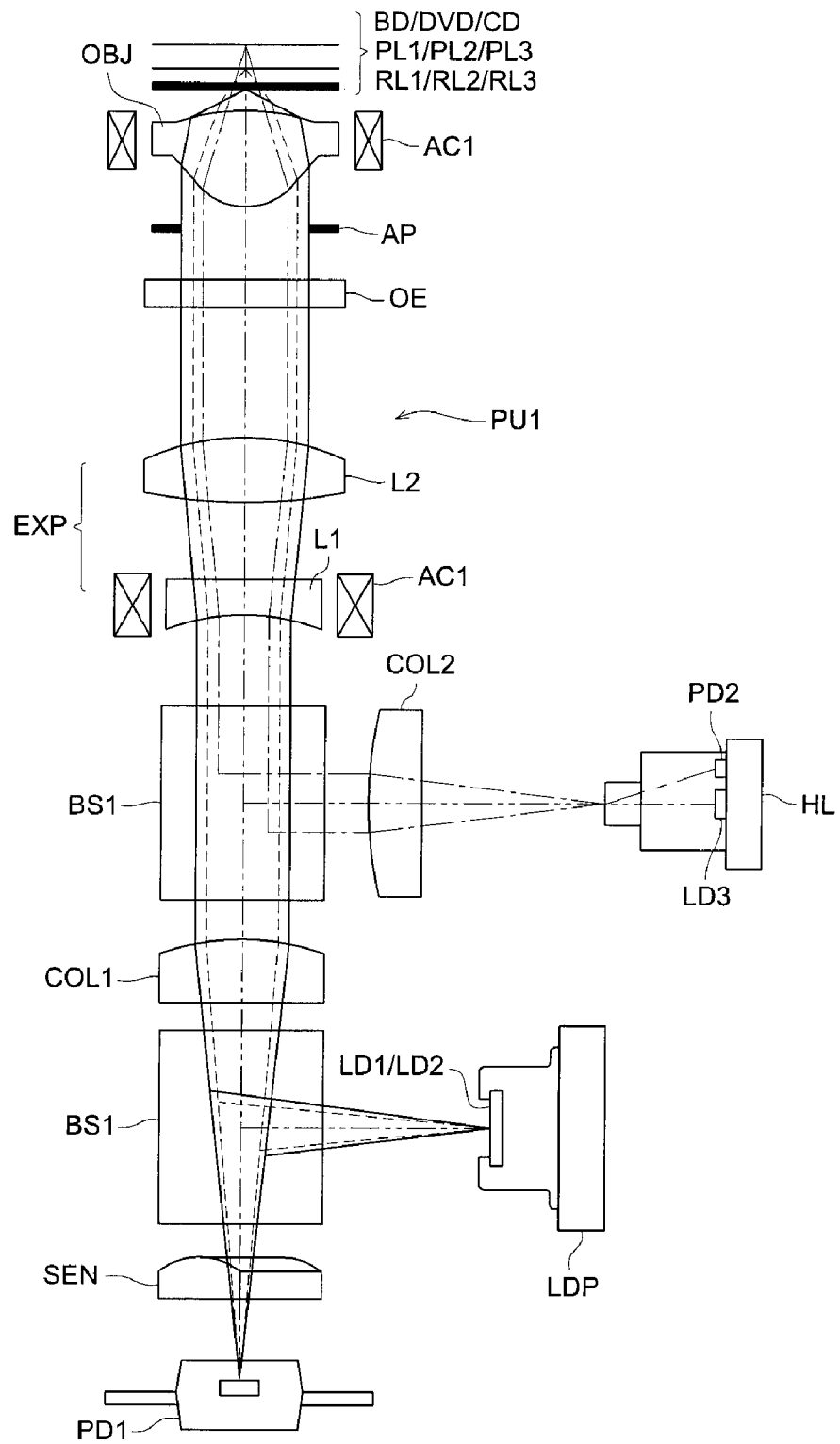
FIG. 13 is a diagram schematically showing the structure of optical pickup apparatus PU1 that can properly record/reproduce information for any of high density optical disc BD (first optical disc), DVD (second optical disc) and CD (third optical disc)

An embodiment of the invention will be explained in detail as follows, referring to the drawings. FIG. 13 is a diagram schematically showing the structure of optical pickup apparatus PU1 that can properly record/reproduce information for any of high density optical disc BD (first optical disc), DVD (second optical disc) and CD (third optical disc). Optical specifications of BD include wavelength λ1=405 nm, thickness t1 of protective layer PL1=0.1 mm and numerical aperture NA1=0.85. Optical specifications of DVD include wavelength λ2=655 nm, thickness t2 of protective layer PL2=0.6 mm and numerical aperture NA2=0.65. Optical specifications of CD include wavelength λ3=785 nm, thickness t3 of protective layer PL3=1.2 mm and numerical aperture NA3=051. However, a combination of the wavelength, the thickness of the protective layer and the numerical aperture is not limited to the aforesaid combination.

The optical pickup apparatus PU1 is composed of laser unit LDP; hologram laser HL; photodetector PD1 for BD/DVD; and objective lens OBJ. Laser unit LDP is equipped with violet semiconductor laser LD1 (first light source) that emits a violet laser light flux (first light flux) with wavelength of 405 nm when recording/reproducing information for BD and with red semiconductor laser LD2 that emits a laser light flux (second light flux) with wavelength of 655 nm radiated when recording/reproducing information for DVD. Hologram laser HL is equipped with infrared semiconductor laser LD3 that emits a laser light flux (third light flux) with wavelength of 785 nm when recording/reproducing information for CD and with photodetector PD2. Objective lens OBJ has functions to converge incident laser light fluxes on information recording surfaces RL1, RL2 and RL3 and includes aspheric surfaces on its both sides, a first phase structure provided on the light source side, and a second phase structure provided on the optical disc side. The optical pickup apparatus PU1 is further composed of biaxial actuator AC1; uniaxial actuator AC2; beam expander EXP; first polarized beam splitter BS1; second polarized beam splitter BS2; sensor lens SEN; first collimator COL1; and second collimator COL2. Beam expander EXP is arranged in a common optical path through which the first-third light fluxes pass commonly, and is composed of the first lens L1 which is movable through the uniaxial actuator AC2 and the second lens L2. First collimator COL1 is arranged in an optical path through which the first and second light fluxes pass, and converts the first and second light fluxes into parallel light fluxes. Second collimator COL2 converts the third light flux into a parallel light flux. Optical element OE having a diffractive structure in a radial shape relating to the present embodiment provides the constitution shown in FIG. 9, and includes a quarter-wavelength-plate member with a functions of a quarter wavelength plate having form birefringence structure on its reverse side. The optical element is arranged between beam expander EXP and objective lens OBJ. Incidentally, it is also possible to use a violet SHG laser in addition to the aforesaid violet semiconductor laser LD1, as a light source for BD. As shown in FIG. 9, the optical element OE has the first area in a form of a flat plate and the second area having a binary type diffractive structure in a radial shape. As shown in FIG. 9, the second area is equally divided into six small areas in the direction of the circumference, and opposing small areas across the optical axis includes binary-type diffractive structures which differ from each other in their pitch (the same in their height). In the present embodiment, the first area is an area corresponding to NA 0.45 or less, and the second area is an area corresponding to NA 0.45 or more and to NA 0.85 or less. Further, with respect to the binary type diffractive structure, its height in the optical axis direction is defined to be the height so as to transmit the first light flux with wavelength 405 nm and the second light flux with wavelength 655 nm without diffracting them, and to diffract the third light flux with wavelength 785 nm. As for height h of this kind, it is preferable to select within a range from $0.9 \cdot 5 \cdot \lambda B/(n-1)$ to $1.1 \cdot 5 \cdot \lambda B/(n-1)$. Where, λB represents a wavelength of the first light flux and n represents a refractive index of a material of an optical element for a wavelength of the first light source. The optical element OE will be explained later in a more detailed way.

When recording/reproducing information for BD in optical pickup apparatus PU1, a position of lens L1 in the optical axis direction is adjusted by uniaxial actuator AC2 so that the first light flux may be emitted from beam expander EXP in the state of a parallel light flux, and then, violet semiconductor laser LD1 is caused to emit light. A divergent light flux emitted from violet semiconductor laser LD1 travels along its optical path drawn with solid lines in FIG. 13. The emitted divergent light flux is reflected by first polarized beam splitter BS1, and is converted by first collimator COL1 into a parallel light flux. Then, the light flux passes through second polarized beam splitter BS2, and is expanded in terms of a diameter by beam expander EXP. The expanded light flux passes through optical element OE to be regulated by diaphragm AP in terms of a light flux diameter, and enters objective lens OBJ in the state of a parallel light to become a spot that is formed on information recording surface RL1 through protective layer PL1 of BD. The objective lens OBJ provides focusing and tracking operations by biaxial actuator AC1 arranged around the objective lens OBJ. At this situation, the first light flux passes though both of the first area and the second area of the optical element OE. The objective lens OBJ converges the first light flux after passing through the first area and the first light flux after passing through the second area on the information recording surface of BD, to use them for recording/reproducing for BD.

A reflected light flux modulated by information pits on information recording surface RL1 passes through objective lens OBJ again, optical element OE, beam expander EXP and second polarized beam splitter BS2, then, first collimator COL1 convert the light flux in to a converged light flux, and sensor lens SEN gives the light flux astigmatism after the light flux passes through first polarized beam splitter BS1. Then, the light flux is converged on a light-receiving surface of photodetector PD. Thus, information recorded on BD can be read by using output signals of the photodetector PD.

When recording/reproducing information for DVD in optical pickup apparatus PU1, a position of lens L1 in the optical axis direction is adjusted by uniaxial actuator AC2 so that the second light flux may be emitted from beam expander EXP in the state of a parallel light flux, and then, red semiconductor laser LD2 is caused to emit light. A divergent light flux emitted from the red semiconductor laser LD2 travels along its light path is drawn with dotted lines in FIG. 13. The emitted divergent light flux is reflected by first polarized beam splitter PBS1, then, first collimator COL1 convert the light flux into a parallel light flux. After the light flux passes through second polarized beam splitter BS2, then, beam expander EXP expand it in terms of a diameter. The light flux passes through optical element OE to be regulated by diaphragm AP in terms of a light flux diameter, and enters objective lens OBJ in the state of a parallel light to become a spot that is formed on information recording surface RL2 through protective layer PL2 of DVD. At this situation, the second light flux passes through the first area and the second area of the optical element OE. Objective lens OBJ converges the first light flux after passing through the first area onto an information recording surface of DVD for recording/reproducing for DVD. On the other hand, with respect to the second light flux after passing through the second area, objective lens OBJ converges a part of the light flux onto an information recording surface of DVD for recording/reproducing for DVD, but the objective lens OBJ does not converge the rest of the light flux after passing through the objective lens onto the information recording surface of DVD, and it is not used for recording/reproducing for DVD. Further details will be explained as follows. The objective lens OBJ includes a phase structure which converts light fluxes corresponding to NA 0.6 or higher to flare light, thus, the phase structure of the objective lens OBJ converts the light flux having passed through the second area and corresponding to the area of NA of 0.6 or higher to flare light, and the light does not form a spot on information recording surface RL2 of DVD. Therefore, the light flux corresponding to an area of NA of 0.6 or less forms a spot on information recording surface RL2 of DVD, but the light flux corresponding to the area of NA being greater than 0.6 does not form a spot on information recording surface RL2 of DVD. The objective lens OBJ provides focusing and tracking operations conducted by biaxial actuator AC1 arranged around the objective lens OBJ.

A reflected light flux modulated by information pits on information recording surface RL2 passes through objective lens OBJ again, optical element OE and beam expander EXP, and then, first collimator COL1 convert the light flux into a converged light flux after the light passes through the second polarized beam splitter BS2. Then, the sensor lens SEN gives astigmatism to the light flux after passing through the first polarized beam splitter BS1, and the light flux is converged on a light-receiving surface of the photodetector PD. Namely, light flux corresponding to an area of NA of 0.6 or less among light fluxes having passed through the first area and the second area of optical element OE is received by the light-receiving surface, while, light flux corresponding to an area of NA exceeding 0.6 among light fluxes having passed through the second area is not received by the light-receiving surface (at least a light-receiving surface of a main sensor). Due to this, information recorded on DVD by the use of output signals of photodetector PD can be read.

Further, when recording/reproducing information for CD in optical pickup apparatus PU1, a position of lens L1 in the optical axis direction is adjusted by uniaxial actuator AC2 so that the third light flux may be emitted from beam expander EXP in the state of a parallel light flux, and then, infrared semiconductor laser LD3 is caused to emit light. A divergent light flux emitted from infrared semiconductor laser LD3 travels along its light path is shown with one-dot chain lines in FIG. 13. The emitted divergent light flux is converted by second collimator COL2 into a parallel light flux and is reflected by the second polarized beam splitter BS2. The light flux enters optical element OE after being enlarged in terms of a diameter by beam expander EXP. Owing to the aperture control function of the optical element OE, a light flux passing through the second area of the optical element OE is emitted as ±first order diffracted light which passes through the objective lens to become flare light, and it is not converged on information recording surface RL3 of CD. On the other hand, a light flux having passed through the first area enters the objective lens OBJ in the state of parallel light, and becomes a spot formed on information recording surface RL3 through protective layer PL3 of CD. The objective lens OBJ provides focusing and tracking operations conducted by biaxial actuator AC1 arranged around the objective lens OBJ.

A reflected light flux (a light flux having passed through the first area of optical element OE) modulated by information pits on information recording surface RL3 passing through objective lens OBJ again, optical element OE and beam expander EXP, and then, is reflected by the second polarized light beam splitter BS2. The collimator COL2 converts the reflected light into converged light flux and the light flux is converged on a light-receiving surface of photodetector PD2 in hologram laser HL. Thus, information recorded on CD by the use of output signals of photodetector PD2 can be read out. On the other hand, the reflected light flux (a light flux having passed through the second area of optical element OE) that has become flare light on information recording surface RL3 becomes flare light as described in detail as follows without covering a light-receiving surface of the main sensor of photodetector PD2, whereby, information recorded on CD can be read properly. For the detail description, the following situation is considered: the optical element generates +first order diffracted light from a light flux emitted from infrared semiconductor laser LD3 and passing through the second area of optical element OE in a optical path toward the information recording surface, and the optical element generates −first order diffracted light from a light flux reflected on information recording surface of CD and passing through the second area of optical element OE in an optical path when the light returns from the information recording surface. The light flux has different diffraction angle between when traveling toward the information recording surface and when returning from the information recording surface as shown in FIG. 10. Therefore, the light flux does not finally become a light flux parallel to the optical axis and can arrive at the photodetector while keeping its state of a flare light. Similarly, the following situation is further considered: the optical element generates −first order diffracted light in an optical path when a light flux travels toward the information recording surface, and that the optical element generates first order diffracted light in an optical path when the light flux returns from the information recording surface. The light flux does not finally become a light flux parallel to an optical axis, therefore, it arrives at the photodetector while keeping its state of a flare light. Therefore, it is possible to prevent these diffracted light fluxes from interfere to each other. Thus, information recorded on CD can be read properly.

With respect to concrete dimensions of the diffractive structure that exhibit aperture control functions, under an example of design wherein focal length of an objective lens for CD wavelength is 2.3 mm in FIG. 13, magnification from an information recording surface of an optical disc to LD or to a light-receiving surface of a sensor is ×15, an outside diameter of the second area is 3.91 mm in optical element OE shown in FIG. 2, and an inside diameter of the second area is 2.30 mm, protrusion PJ constituting radial diffractive structure DS in FIG. 3 has length L of 0.805 mm in the radial direction. Further, when protrusion PJ has width W1 on the inside diameter side of 35 μm, width W2 on the outside diameter side of 60 μm and height H of 3.76 μm, and a refractive index of an optical element of 1.54 by neglecting wavelength dispersion, the diffractive structure in a radial shape does not diffract light fluxes with wavelength 405 nm and wavelength 655 nm and transmits most of light fluxes. The diffractive structure diffracts only a light flux with a wavelength is 785 nm and generates ±first order diffracted lights. Thus, the optical element enables to convert a light flux corresponding to an area of NA which is other than necessary into a flare light on the information recording surface of the optical disc, and it exhibits appropriate aperture control functions in the optical pickup apparatus of the present embodiment. Further, for the purpose to make a light flux reflected on the information recording surface of the optical disc to be a sufficiently large flare when it passes through optical element OE and objective lens OBJ again not to enter the sensor, the diffractive structure in a radial shape of the second area is divided into six portions in optical element OE' shown in FIG.

Figure 15:
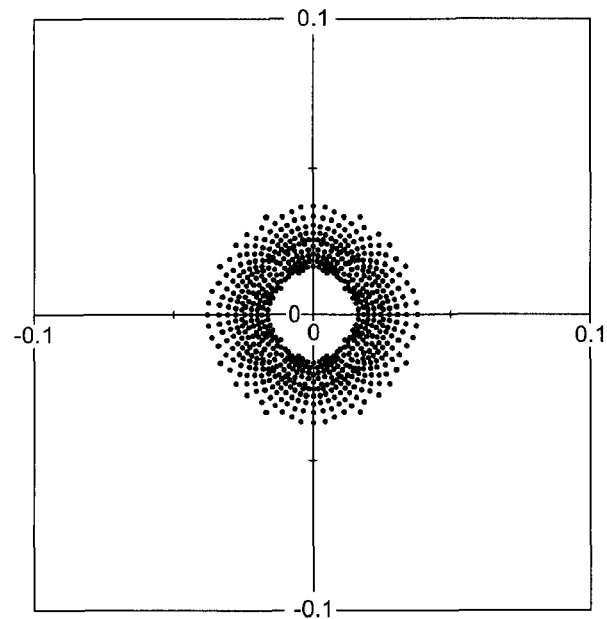
FIG. 15 is a diagram showing compounded spots.
Figure 16:
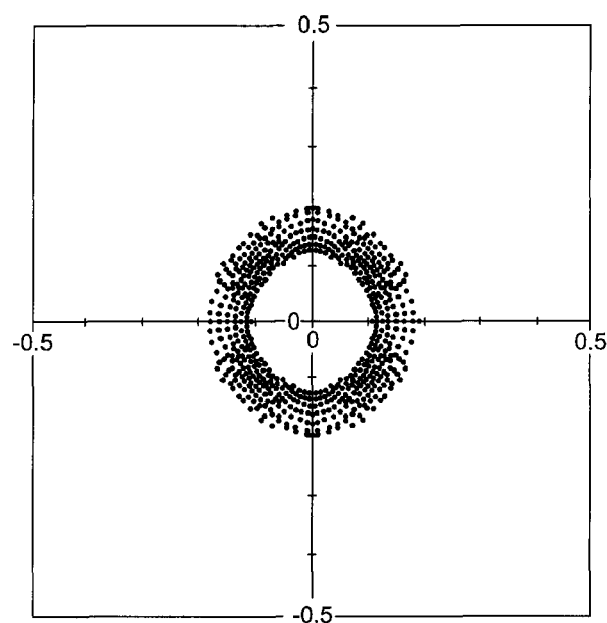
FIG. 16 is a diagram showing spots on a light-receiving surface of a sensor on the occasion where the magnification covering from an information recording surface of the optical disc to a light-receiving surface of a sensor (photodetector) is ×15.

9 with area DS2 and area DS2' opposing to each other. In the divided portions, the area DS2 takes the aforesaid W1 and W2, while, area DS2' takes width W1' on the inside diameter side and width W2' on the outside diameter side. FIG. 14(a) and FIG. 14(b) show respectively spots of +first order diffracted light and spots of −first order diffracted light both on the information recording surface of the optical disc under the condition that W1' is 24 μm and W2' is 40 μm. These spots are compounded to create spots shown in FIG. 15. As is apparent from FIG. 15, excellent aperture control functions are exhibited on the information recording surface of the optical disc first. Further, FIG. 16 shows spots on the sensor under the condition that a magnification from the information recording surface of the optical disc to the light-receiving surface of the sensor (photodetector) is ×15. Since a size of the main sensor in a photodetector of a quadratic split type used in an astigmatism method at this magnification is about 120 μm square, a flare light is sufficiently out of a light-receiving surface of the sensor.

Figure 17A:
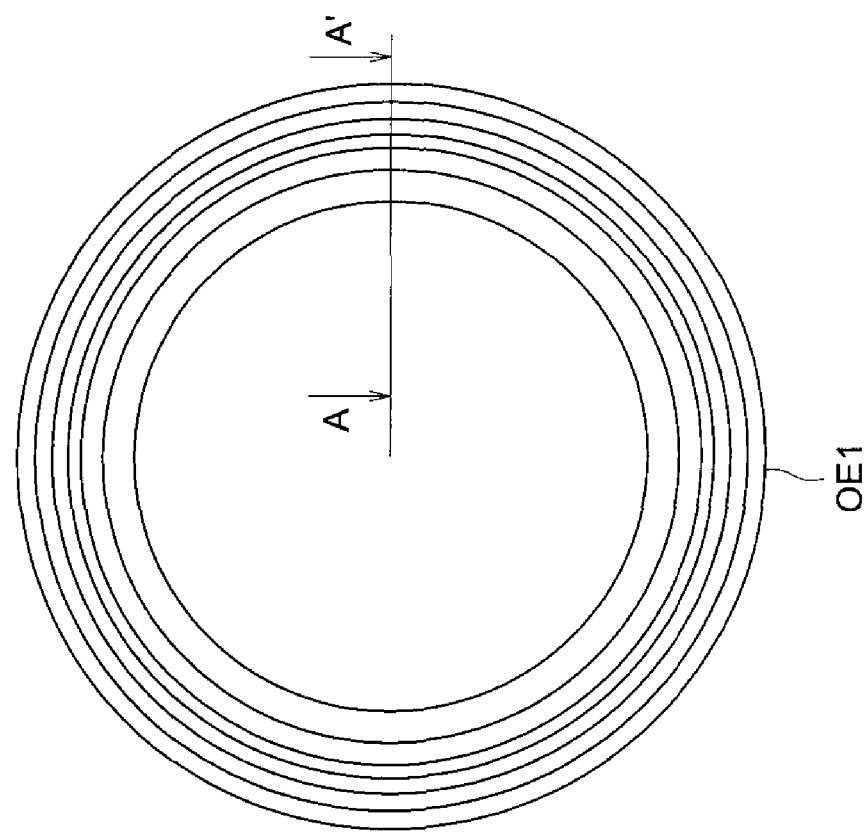
FIGS. 17(a) and 17(b) are diagrams showing the structure of optical element OE1.
Figure 17B:
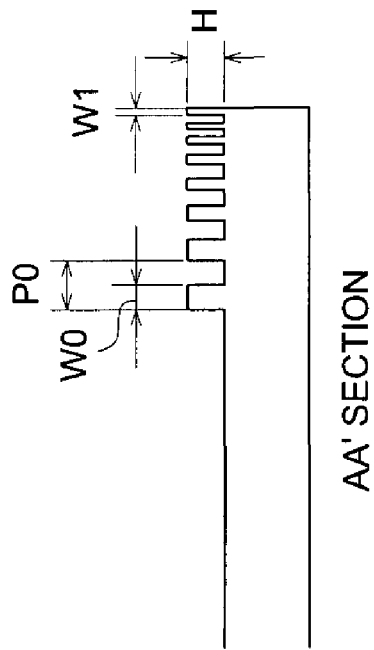
Figure 18:
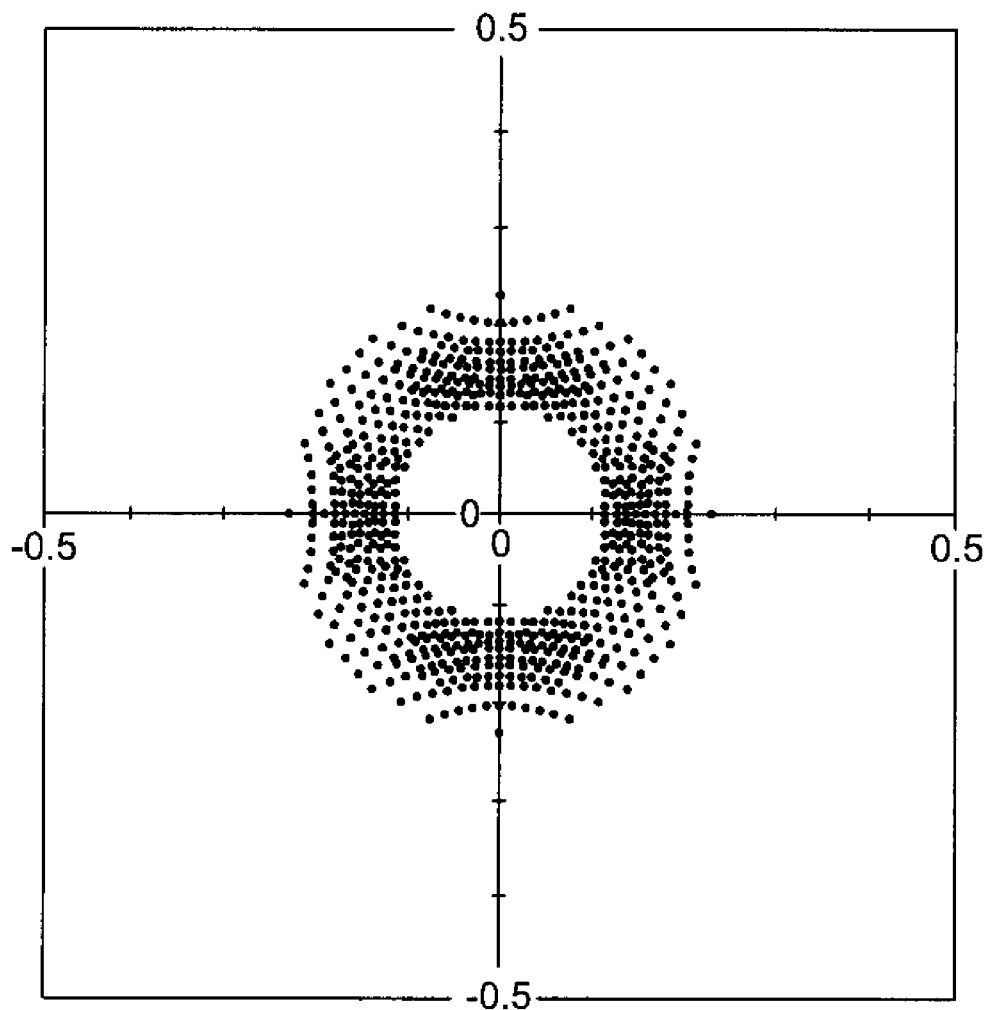
FIG. 18 is a diagram showing an example of spots on a light-receiving surface of a sensor.
Figure 21:
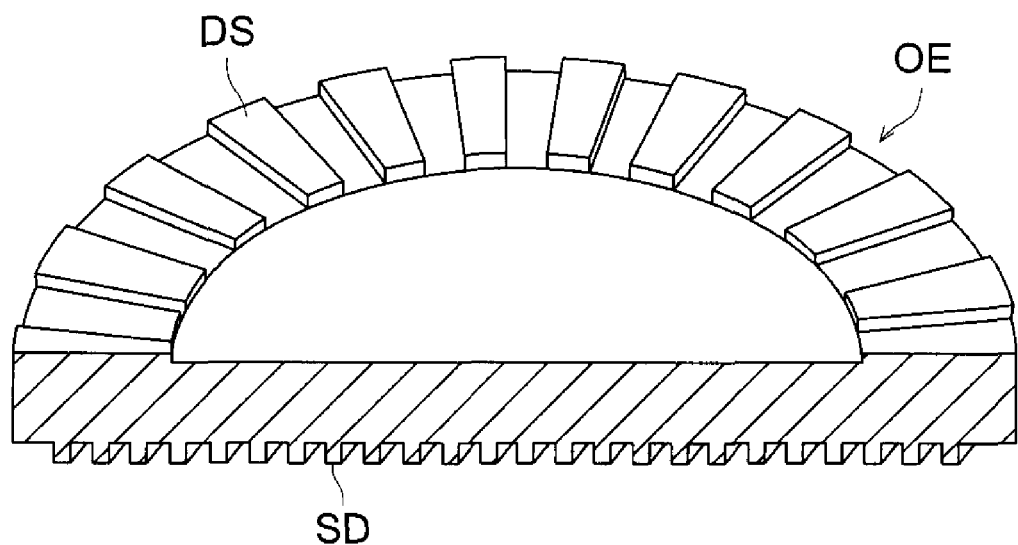
FIG. 21 is a perspective view in section showing optical element OE including a form birefringence structure SD formed on one side thereof, and radial diffractive structure DS relating to the invention formed on the other side thereof.

For obtaining the same effect in the aforesaid ring-shaped zone diffractive structure, optical element OE1 as a comparative example needs to be structured as shown in FIG. 17(a) and FIG. 17(b). Pitch PO at an inner circumference needs to be 15 μm, namely, width W0 on the inner circumference side needs to be 7.5 μm. While, a pitch at an outer circumference needs to be 12 μm, namely, width W1 needs to be 6 μm. Height H and a refractive index of the optical element are respectively 3.76 μm and 1.54 as in the foregoing. In this way, the spots on the light-receiving surface of the sensor which are the same as those in the aforesaid diffractive structure in a radial shape are obtained as shown in FIG. 18. Therefore, by utilizing a diffractive structure in a radial shape, it is possible to provide a broaden flare on the sensor with the structure which is not so fine compared with the ring-shaped diffraction. Therefore, the present invention provides an optical element that can be manufactured easily and exhibit the same effect for the flare.

Figure 26:
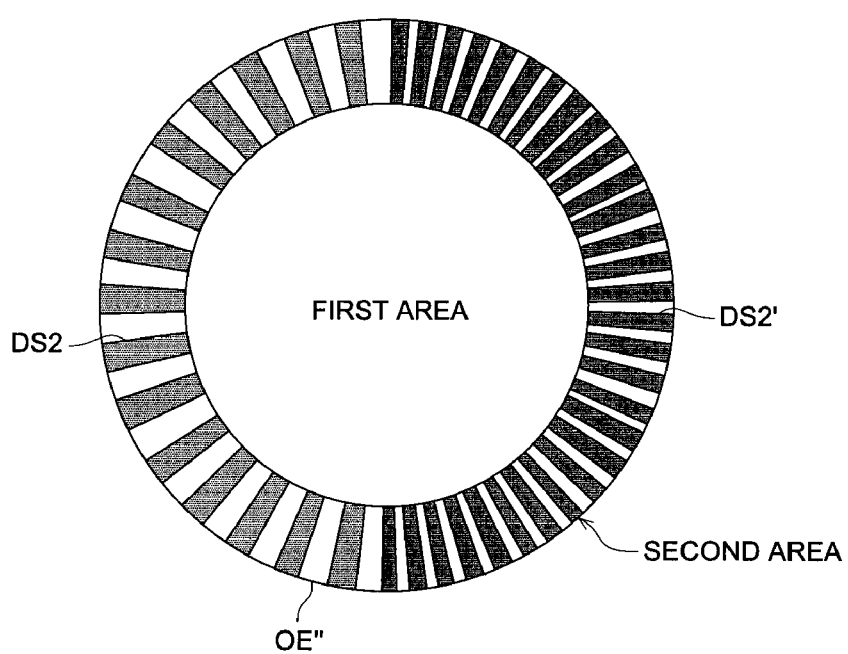
FIG. 26 is a diagram showing an example wherein a diffractive structure in a radial shape is divided into two portions.
Figure 27A:
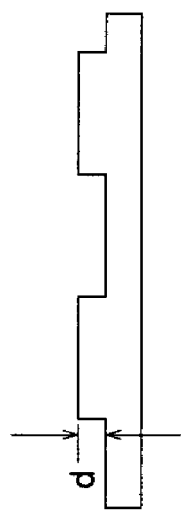
Figure 27B:
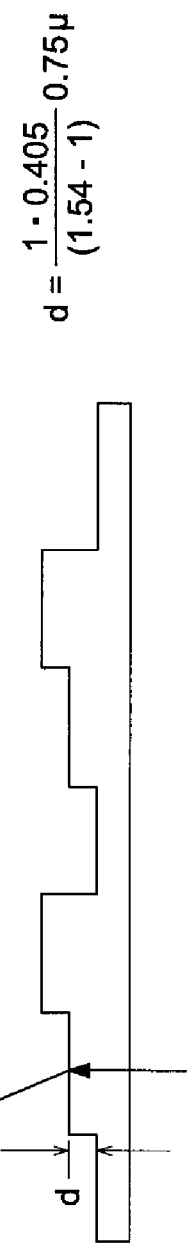

Further, as another example of an aperture control element employing a diffraction structure in a radial shape, there will be shown an example of optical element OE" which includes two divided portions, reducing the number of division for the aforesaid optical element with 6 divided portions. An example of division of the diffractive structure in a radial shape of this kind is shown in FIG. 26. Width W1, W2, W1', W2', a height and a refractive index of the areas DS2 and DS2' are the same as those of the optical element with 6 divided portions. FIG. 19(a) shows spots of +first order diffracted light on an information recording surface of optical disc formed by the optical element and FIG. 19(b) shows spots of −first order diffracted light on an information recording surface of optical disc by the optical element. FIG. 20(a) shows compounded spots on an information recording surface of the optical disc, and FIG. 20(b) shows spots on a light-receiving surface of a sensor. Further, each of FIGS. 27(a) and 27(b) shows an example of design of a diffractive structure compatibly used for BD and DVD. When the diffractive structure uses one-step structure as shown in FIG. 27(a) and when the diffractive structure uses two-step structure as shown in FIG. 27(b), step d of the diffractive structure is 0.75 μm.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

For example, though the present embodiment has a structure compatibly used for 3 types of discs of BD, DVD and CD, the invention can also be applied to a structure compatibly used for 3 types of discs of HD, DVD and CD. The diffractive structure in a radial shape may be arranged either on a surface facing the light source or a surface facing the optical disc. Further, an optical pickup apparatus employing an optical element of the invention may also record/reproduce information compatibly for two types of optical discs.

What is claimed is:

1. An optical element for an optical pickup apparatus, the optical element comprising:
   a first area including an optical axis of the optical element; and
   a second area surrounding the first area and comprising a diffractive structure in a radial shape,
   wherein the optical elements is used for the optical pickup apparatus which records or reproduces information by converging at least a light flux with a wavelength $\lambda 2$ from a light source onto an information recording surface of an optical disc and by receiving a light flux reflected by the information recording surface by a photodetector,
   wherein the first area transmits a light flux from the light source, and the second area diffracts a light flux with the wavelength $\lambda 2$ from the light source,
   wherein the optical pickup apparatus records or reproduces information by converging a first light flux with a first wavelength $\lambda 1$ emitted from a first light source onto an information recording surface of a first optical disc including a protective substrate with a thickness t1, by converging a second light flux with a second wavelength $\lambda 2$ ($\lambda 2 > \lambda 1$) emitted from a second light source onto an information recording surface of a second optical disc including a protective substrate with a thickness t2 (t1≦t2), and by receiving a light flux reflected by the information recording surface of each of the first and second optical discs by a photodetector, and
   wherein the first area transmits the first light flux and the second light flux, and the second area transmits the first light flux and diffracts the second light flux.

2. The optical element of claim 1,
   wherein the first light flux after passing through the second area and the second light flux after passing through the second area travel in different directions from each other.

3. The optical element of claim 1,
   wherein the second light flux after passing through the second area becomes a flare light on the information recording surface of the second optical disc.

4. The optical element of claim 1,
   wherein the diffractive structure is a binary-type diffractive structure.

5. The optical element of claim 1,
   wherein the diffractive structure is a stair-type diffractive structure.

6. The optical element of claim 1,
   wherein the second area is in a ring shape, and is divided into 2·n portions along a circumference of the ring shape, where n is an odd number, and
   opposing portions across the optical axis among the 2·n portions comprise different diffractive structures from each other.

7. The optical element of claim 6,
   wherein the opposing portions across the optical axis comprise diffractive structures which are different in pitch from each other.

8. The optical element of claim 6,
wherein the diffractive structure is a stair-type diffractive structure, and
the opposing portions across the optical axis comprise stairs which rise in different directions from each other around the optical axis.

9. The optical element of claim 1,
wherein the optical element further comprises a quarter-wavelength-plate member.

10. An optical pickup apparatus comprising:
a first light source for emitting a first light flux with a first wavelength $\lambda 1$;
a second light source for emitting a second light flux with the second wavelength $\lambda 2$ ($\lambda 2 > \lambda 1$);
the optical element of claim 1;
an objective lens for conversing the first light flux onto an information recording surface of a first optical disc including a protective substrate with a thickness t1, and conversing the second light flux onto an information recording surface of a second optical disc including a protective substrate with a thickness t2 (t1≦t2); and
a photodetector,
wherein the optical pickup apparatus records or represents information by which the objective lens converses the first light flux after passing through the first area and the first light flux after passing through the second area onto the information recording surface of the first optical disc, and
by which the objective lens converses the second light flux after passing through the first area onto the information recording surface of the second optical disc and does not converge the second light flux diffracted by the second area onto the information recording surface of the second optical disc.

11. An optical pickup apparatus comprising:
a first light source for emitting a first light flux with a first wavelength $\lambda 1$;
a second light source for emitting a second light flux with the second wavelength $\lambda 2$ ($\lambda 2 > \lambda 1$);
a third light source for emitting a third light flux with a third wavelength $\lambda 3$ ($\lambda 1 < \lambda 3 < \lambda 2$);
the optical element of claim 1;
an objective lens for conversing the first light flux onto an information recording surface of a first optical disc including a protective substrate with a thickness t1, conversing the second light flux onto an information recording surface of a second optical disc including a protective substrate with a thickness t2 (t1≦t2), and conversing the third light flux onto an information recording surface of a third optical disc including a protective substrate with a thickness t3 (t1≦t3<t2); and
a photodetector,
wherein the optical pickup apparatus records or represents information by which the first area and the second area transmit the third light flux,
by which the objective lens converges the first light flux after passing through the first area and the first light flux after passing through the second area onto the information recording surface of the first optical disc,
by which the objective lens converges the second light flux after passing through the first area onto the information recording surface of the second optical disc and does not converges the second light flux diffracted by the second area onto the information recording surface of the second optical disc, and
by which the objective lens converges the third light flux after passing through the first area onto the information recording surface of the third optical disc, and transmits the third light flux after passing through the second area to converge a part of the third light flux after passing through the second area onto the information recording surface of the third optical disc and not to converge a rest part of the third light flux after passing through the second area onto the information recording surface of the third optical disc.

12. An optical element for use in an optical pickup apparatus which records or reproduces information by converging at least a light flux with a wavelength $\lambda 2$ from a light source onto an information recording surface of an optical disc and by receiving a light flux reflected by the information recording surface by a photodetector, the optical element comprising:
a first area including an optical axis of the optical element; and
a second area surrounding the first area and comprising a plurality of steps,
wherein the first area transmits a light flux from the light source, and the second area changes a traveling direction of a light flux with the wavelength $\lambda 2$ from the light source,
the second area is in a ring shape, and is divided into 2·n portions along a circumference of the ring shape, where n is an odd number, and
opposing portions across the optical axis among the 2·n portions are different in at least one of size and shape of the steps from each other.

13. An optical element for an optical pickup apparatus, the optical element comprising:
a first area including an optical axis of the optical element; and
a second area surrounding the first area and comprising a diffractive structure in a radial shape,
wherein the optical elements is used for the optical pickup apparatus which records or reproduces information by converging at least a light flux with a wavelength $\lambda 2$ from a light source onto an information recording surface of an optical disc and by receiving a light flux reflected by the information recording surface by a photodetector,
wherein the first area transmits a light flux from the light source, and the second area diffracts a light flux with the wavelength $\lambda 2$ from the light source, and
wherein the second area is in a ring shape, and is divided into 2·n portions along a circumference of the ring shape, where n is an odd number, and
opposing portions across the optical axis among the 2·n portions comprise different diffractive structures from each other.

14. The optical element of claim 13,
wherein the opposing portions across the optical axis comprise diffractive structures which are different in pitch from each other.

15. The optical element of claim 13,
wherein the diffractive structure is a stair-type diffractive structure, and
the opposing portions across the optical axis comprise stairs which rise in different directions from each other around the optical axis.

16. The optical element of claim 13,
wherein the optical element further comprises a quarter-wavelength-plate member.

* * * * *